US012694313B2

(12) United States Patent
Schutski et al.

(10) Patent No.: US 12,694,313 B2
(45) Date of Patent: Jul. 28, 2026

(54) QUANTUM CIRCUIT SIMULATION

(71) Applicants: Huawei Technologies Co., Ltd., Shenzhen (CN); Skolkovo Institute of Science and Technology, Moscow (RU)

(72) Inventors: Roman Sergeevich Schutski, Moscow (RU); Ivan Valerevich Oseledets, Moscow (RU); Yuriy Alexandrovich Zotov, Moscow (RU); Dmitry Sergeevich Kolmakov, Moscow (RU)

(73) Assignees: Huawei Technologies Co., Ltd., Shenzhen (CN); Skolkovo Institute of Science and Technology, Moscow (RU)

( * ) Notice: Subject to any disclaimer, the term of this patent is extended or adjusted under 35 U.S.C. 154(b) by 1085 days.

(21) Appl. No.: 17/717,914

(22) Filed: Apr. 11, 2022

(65) Prior Publication Data

US 2022/0245499 A1      Aug. 4, 2022

Related U.S. Application Data

(63) Continuation of application No. PCT/RU2019/000727, filed on Oct. 11, 2019.

(51) Int. Cl.
 G06N 10/20 (2022.01)
 G06N 10/60 (2022.01)
(52) U.S. Cl.
 CPC ............. G06N 10/20 (2022.01); G06N 10/60 (2022.01)

(58) Field of Classification Search
 None
 See application file for complete search history.

(56) References Cited

U.S. PATENT DOCUMENTS

| | | | |
|---|---|---|---|
| 11,334,693 B1 * | 5/2022 | Flammia | .................. G06N 7/01 |
| 2016/0071021 A1 * | 3/2016 | Raymond | .............. G06N 10/40 |
| | | | 712/28 |
| 2021/0081804 A1 * | 3/2021 | Stojevic | ................. G06N 3/088 |

(Continued)

OTHER PUBLICATIONS

Graph Theory and Sparse Matrix Computation; Author: George et. al.; https://link.springer.com/book/10.1007/978-1-4613-8369-7 (Year: 1993).*

(Continued)

*Primary Examiner* — Mandrita Brahmachari

(74) *Attorney, Agent, or Firm* — Leydig, Voit & Mayer, Ltd.

(57) ABSTRACT

An apparatus and method for simulating a quantum circuit are provided. In particular, an indication of a subset of input and output qubits of the quantum circuit is received. The indicated subset corresponds to an amplitude tensor of the quantum circuit that is to be determined, wherein the amplitude tensor comprises amplitudes for different combinations of states of the qubits of the indicated subset. Using a tensor network of the quantum circuit and Restricted Maximum Cardinality Search (RMCS), an elimination order of intermediate qubits within the quantum circuit is determined. The amplitude tensor is determined by removing, successively in accordance with the elimination order, that indices of the tensors of the tensor network that correspond to the intermediate qubits from the tensor network.

20 Claims, 10 Drawing Sheets

(56) References Cited

U.S. PATENT DOCUMENTS

| | | | | |
|---|---|---|---|---|
| 2021/0350056 A1* | 11/2021 | Chen | ................. | G06F 17/16 |
| 2021/0406954 A1* | 12/2021 | Kachman | ............. | G06N 10/60 |

OTHER PUBLICATIONS

Classical Simulation of Intermediate-Size Quantum Circuits; Author: Chen et. al. (Year: 2018).*
Simulation of low-depth quantum circuits as complex undirected graphical models Boixo et. al. (Year: 2018).*
Chen et al., "Classical Simulation of Intermediate-Size Quantum Circuits," Arxiv.org, Cornell University Library, pp. 1-12, XP080885512 (Submitted on May 3, 2018, last revised May 7, 2018).
De Raedt et al., "Massively parallel quantum computer simulator, eleven years later," Preprint submitted to Computer Physics Communications, arxiv.org, Cornell University Library, Total 18 pages (May 2018).
Bauer, "Tensor network states," Diss. ETH No. 19916, Total 188 pages (2011).
Chakraborty et al., "Space-efficient algorithms for maximum cardinality search, its applications, and variants of BFS," Journal of Combinatorial Optimization (2019), vol. 37, No. 2, pp. 465-481, XP036714951, Springer Science +Business Media, LLC, part of Springer Nature 2018 (Mar. 1, 2018).
Markov et al., "Simulating quantum computation by contracting tensor networks," arxiv.org, Cornell University Library, pp. 1-21 (Jul. 2009).
Biamonte et al. "Quantum Tensor Networks in a Nutshell," arxiv. org, Cornell University Library, pp. 1-34 (Jul. 31, 2017).
Boixo et al., "Simulation of low-depth quantum circuits as complex undirected graphical models," arxiv.org, Cornell University Library, pp. 1-12 (Jan. 2018).
Guo et al., "General-Purpose Quantum Circuit Simulator with Projected Entangled-Pair States and the Quantum Supremacy Frontier," Physical Review Letter 123, 190501, pp. 1-6, American Physical Society (Nov. 2019).

Li et al., "Quantum Supremacy Circuit Simulation on Sunway TaihuLight," arxiv.org, Cornell University Library, Total 11 pages (Aug. 2018).
Villalonga et al., "A flexible high-performance simulator for verifying and benchmarking quantum circuits Implemented on real hardware," Nature Partner Journals, Quantum Information 5, Article No. 86, pp. 1-16, https://doi.org/10.1038/s41534-019-0196-1 (Oct. 2019).
Pednault et al., "Breaking the 49-Qubit Barrier in the Simulation of Quantum Circuits," arxiv.org, Cornell University Library, Total 25 pages (Oct. 2017).
Khammassi et al., "QX: A High-Performance Quantum Computer Simulation Platform," Design, Automation and Test in Europe Conference and Exhibition (Date), 2017, pp. 464-469, doi: 10.23919/DATE.2017.7927034, Institute of Electrical and Electronics Engineers, New York, New York (Mar. 2017).
Chen et al., "64-qubit quantum circuit simulation," Chinese Science Bulletin, Total 21 pages (2018).
Jones et al., "QuEST and High Performance Simulation of Quantum Computers," Nature, Scientific Reports 9, 10736 (2019), https://doi.org/10.1038/s41598-019-47174-9 (Jul. 2019).
Bodlaender et al., "On exact algorithms for treewidth," ACM Transactions on Algorithms, vol. 9, No. 1, Total 28 pages (Dec. 2012).
Zhang et al., "Alibaba Cloud Quantum Development Platform: Large-Scale Classical Simulation of Quantum Circuits," Arxiv.org, Cornell University Library, pp. 1-5 (Sep. 5, 2019).
Tarjan et al., "Simple Linear-Time Algorithms to Test Chordality of Graph, Test Acyclicity of Hypergraphs, and Selectively Reduce Acyclic Hypergraphs," Society for Industrial and Applied Mathematics, vol. 13, No. 3, Total 1 page (Aug. 1984).
Gogate et al., "A Complete Anytime Algorithm for Treewidth," UAI'04: Proceedings of the 20th conference on Uncertainty in artificial intelligence, pp. 201-208 (Jul. 2004).
Dechter et al., "Bucket elimination: A unifying framework for reasoning," Artificial Intelligence 113, pp. 41-85, Elsevier Science B.V. (May 1999).

* cited by examiner

Fig. 1            Fig. 2
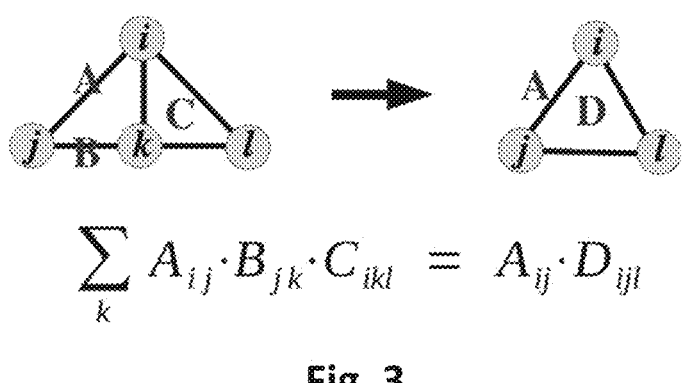
$$\sum_{k} A_{ij} \cdot B_{jk} \cdot C_{ikl} = A_{ij} \cdot D_{ijl}$$
Fig. 3
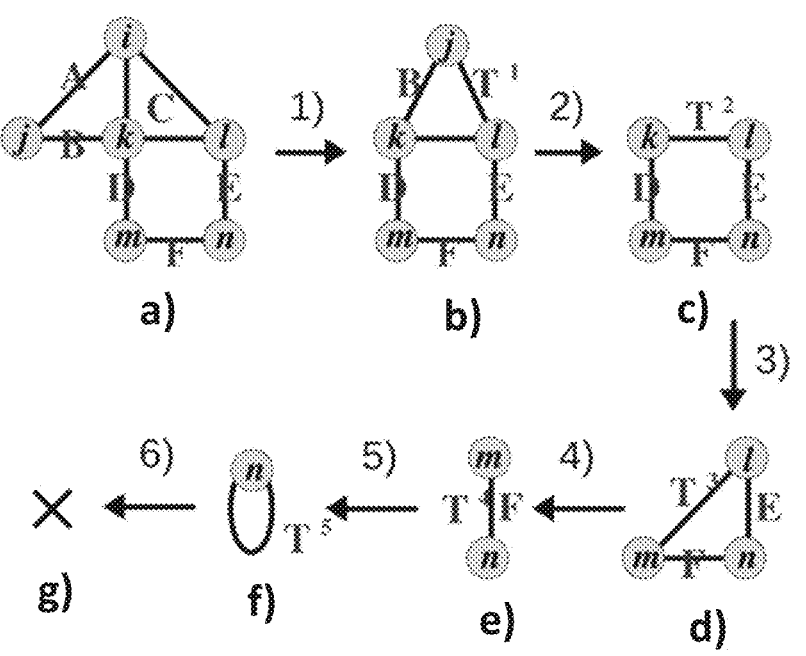
Fig. 4

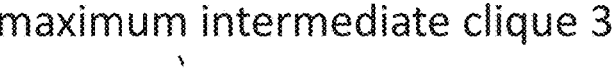
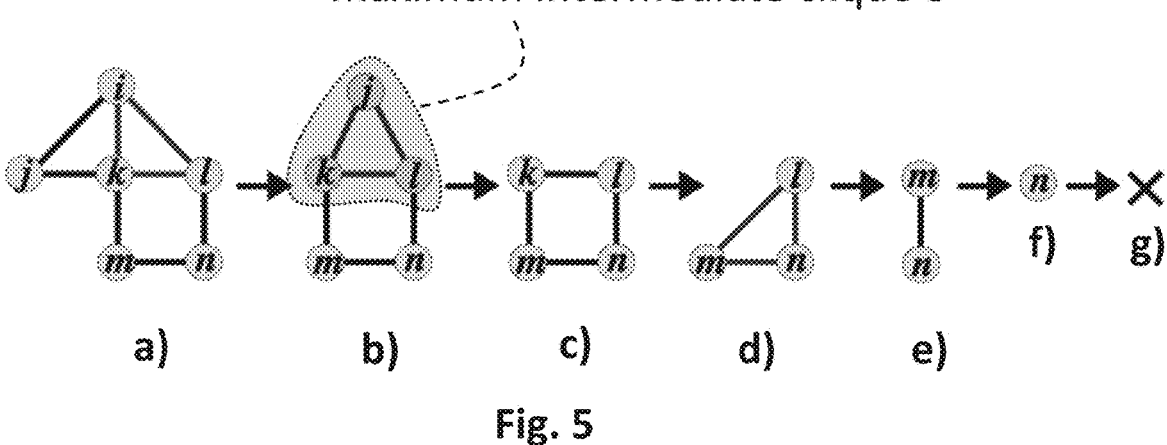
Fig. 5
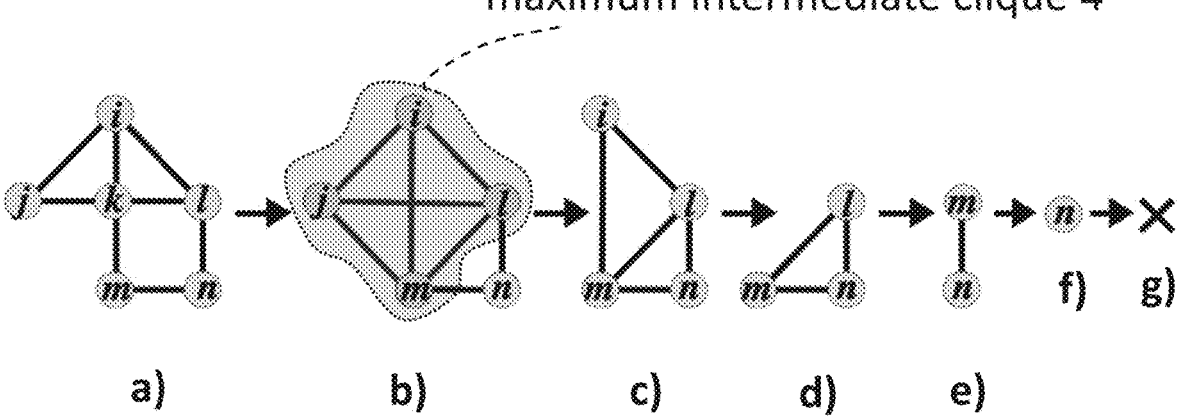
Fig. 6 a)
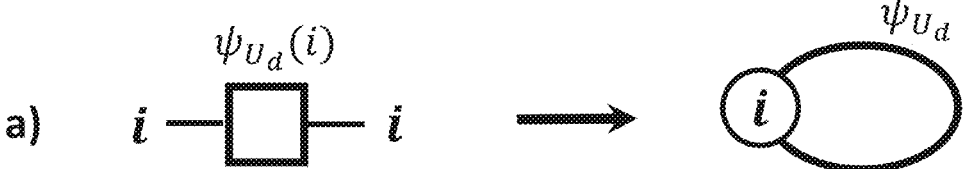
b)
c)
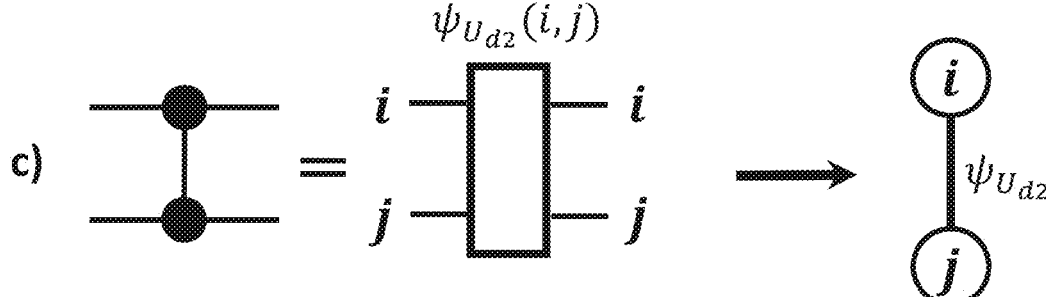
d)
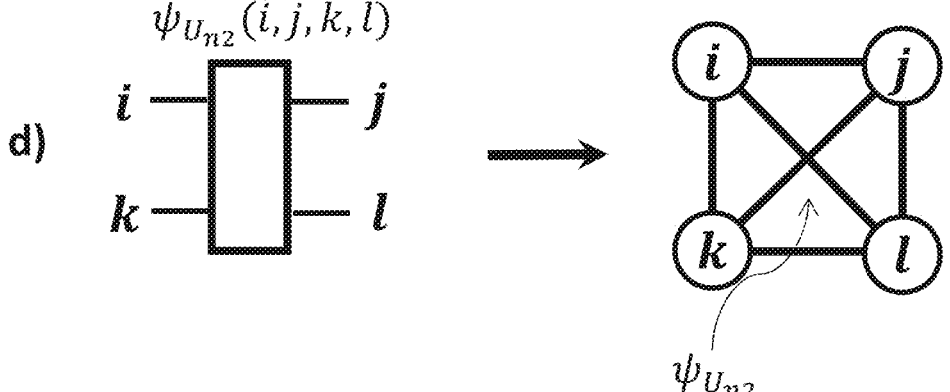
Fig. 8

Input: graph $G = (V, E)$ and elimination order $\pi: V \to \{1, \dots, |V|\}$

S1420
set $i = 1$, and $\tilde{E} = E$

S1440
set $\tilde{E} = \tilde{E} \cup \{(x, y) | x, y \in N((\pi^{-1}(i)) \wedge \pi(x) > i \wedge \pi(y) > i \wedge x \neq y\}$ S1450
set $i = i + 1$ $i = |V| - 2$?
Yes     No

S1460

Output: chordal graph $H = (V, \tilde{E})$

S1560
set $U = \{w | w \in N(\pi^{-1}(i)) \wedge \pi(w) > i\}$

S1580
set $\tilde{E} = \tilde{E} \cup \{(x, y) | x, y \in U \wedge x \neq y\}$

S1440

QUANTUM CIRCUIT SIMULATION

CROSS-REFERENCE TO RELATED APPLICATIONS

This application is a continuation of International Application No. PCT/RU2019/000727, filed on Oct. 11, 2019, which is hereby incorporated by reference in its entirety.

TECHNICAL FIELD

Embodiments of the present disclosure relate to the field of quantum circuit simulation.

BACKGROUND

Recently, several quantum computers have been developed by various companies.

However, quantum computers are still not commercially available. In order to enable development of quantum algorithms, as well as verification and validation of the upcoming quantum processors, quantum computer simulators may provide an efficient platform.

However, in practice, simulation of quantum computers and in general quantum circuits is a highly complex task, which requires in particular a large amount of memory. The complexity grows with the number of qubits processed in the simulation.

There have been different approaches regarding the quantum circuit simulation. Some of them are listed below and further referred to in the description:

[1] H. De Raedt et al., "*Massively parallel quantum computer simulator, eleven years later*", Comput. Phys. Commun., vol. 237, pp. 47-61, 2019, arXiv: 1805.04708v2 [quant-ph].

[2] I. L. Markov and Y. Shi, "*Simulating quantum computation by contracting tensor networks*", SIAM J. Comput., vol. 38, no. 3, pp. 963-981, January 2005, arXiv: quant-ph/0511069v7.

[3] S. Boixo, S. V. Isakov, V. N. Smelyanskiy, and H. Neven, "*Simulation of low-depth quantum circuits as complex undirected graphical models*", December 2017, arXiv: 1712.05384v2 [quant-ph].

[4] J. Chen, F. Zhang, C. Huang, M. Newman, and Y. Shi, "*Classical Simulation of Intermediate-Size Quantum Circuits*", May 2018, arXiv: 1802.06952v3 [quant-ph].

[5] R. E. Tarjan and M. Yannakakis, "*Simple Linear Time Algorithm To Test Chordality of Graph, Test Acyclicity Of Hypergraphs, And Selectively Reduce Acyclic Hypergraphs*", SIAM J. Comput., vol. 13, no. 3, pp. 566-579, 1984.

SUMMARY

The above mentioned approaches may still suffer from complexity and low flexibility regarding the selection of the results to be simulated.

The present disclosure is defined by the independent claims. Some of the advantageous embodiments are subject matter to the dependent claims.

According to a first aspect, the disclosure relates to an apparatus for decoding for simulating a quantum circuit. The apparatus includes a processing circuitry. The processing circuitry is configured to receive an indication of a subset of input and output qubits of the quantum circuit, the indicated subset corresponding to an amplitude tensor of the quantum circuit that is to be determined, the amplitude tensor comprising amplitudes for different combinations of states of the qubits of the indicated subset; determine, using a tensor network of the quantum circuit and Restricted Maximum Cardinality Search (RMCS), an elimination order of intermediate qubits within the quantum circuit; and determine the amplitude tensor by removing, successively in accordance with the elimination order, that indices of the tensors of the tensor network that correspond to the intermediate qubits from the tensor network.

Using RMCS it is possible to determine an optimal/optimized elimination sequence for an arbitrary subset of amplitudes. This may reduce the computational cost and memory requirements to simulate quantum circuits.

In a possible first implementation form of the apparatus according to the first aspect or the first aspect as such, the elimination order is determined iteratively, in reverse order, by selecting from the intermediate qubits, in each step of the iteration, an intermediate qubit that i) has not been selected in any preceding step of the iteration, and ii) corresponds, in a chordal graph representing the tensor network, to a vertex neighboring a maximum number of vertices that correspond to either a) an intermediate qubit that has been selected in any preceding step of the iteration, or b) a qubit in the indicated subset.

In a possible implementation form of the apparatus according to the first implementation form of the first aspect or the first aspect as such, each intermediate qubit uniquely corresponds to a respective index of the tensors, each qubit in the indicated subset uniquely corresponds to a respective index of the tensors, and each index of the tensors uniquely corresponds to either an input qubit, an output qubit, or an intermediate qubit; and/or there is a one to one correspondence between the vertices of the chordal graph and that indices that correspond to either an intermediate qubit or a qubit in the indicated subset.

In a possible implementation form of the apparatus according to the second implementation form of the first aspect or the first aspect as such, the chordal graph representing the tensor network is a chordal completion of a non-chordal graph representing the tensor network that has a minimized maximal clique among chordal completions of said non-chordal graph.

In a possible implementation form of the apparatus according to the preceding implementation or the first aspect as such, the chordal graph is obtained from the non-chordal graph representing the tensor network using an optimized elimination order of the vertices of the non-chordal graph, wherein the chordal graph is obtained by adding edges to said non-chordal graph such that, for each vertex, all neighbors of the vertex that are later in the optimized elimination order than said vertex are a clique in the chordal graph.

In a possible implementation form of the apparatus according to the preceding implementation or the first aspect as such, for each quantum gate of the quantum circuit, there is a tensor of the tensor network that has, for each qubit of the quantum gate that is either an intermediate qubit or in the indicated subset, one index that corresponds to said qubit; for each quantum gate of the quantum circuit, that vertices of the non-chordal graph that correspond to the qubits of said quantum gate are a clique.

In a possible implementation form of the apparatus according to the preceding implementation or the first aspect as such, the determining of the elimination order of the intermediate qubits includes determining the optimized elimination order.

In a possible implementation form of the apparatus according to the preceding implementation or the first aspect as such, the optimized elimination order of the vertices of the non-chordal graph representing the tensor network is determined using an optimization procedure. The optimization procedure minimizes a maximal clique of that graph that is obtained by adding edges to the non-chordal graph such that, for each vertex of the graph, all neighbors of said vertex that are later in the optimized elimination order than said vertex are a clique in the graph.

In a possible implementation form of the apparatus according to the two preceding implementations or the first aspect as such, before the determining of the optimized elimination order, the non-chordal graph is modified by adding, to the non-chordal graph, edges such that the vertices corresponding to the qubits of the indicated subset are a clique.

In a possible implementation form of the apparatus according to the first implementation form of the first aspect or the first aspect as such, the processing circuitry is configured to determine, in accordance with the indicated subset, the non-chordal graph representing the tensor network such that i) there is a one to one correspondence between the vertices of the non-chordal graph and that indices of the tensors that correspond to either an intermediate qubit or a qubit in the indicated subset; and ii) for each tensor of the tensor network, the vertices of the non-chordal graph that correspond to said tensor are a clique.

In a possible implementation form of the apparatus according to the first implementation form of the first aspect or the first aspect as such, the processing circuitry is configured to determine, in accordance with the indicated subset, the non-chordal graph representing the tensor network from a generic non-chordal graph representing the tensor network by adding i) for each input or output qubit that is in the indicated subset, a single vertex that corresponds to said qubit, and ii) edges such that, for each quantum gate of the quantum circuit, that vertices of the non-chordal graph that correspond to the qubits of said quantum gate are a clique, wherein there is a one to one correspondence between the vertices of the generic non-chordal graph and the intermediate qubits.

In a possible implementation form of the apparatus according to the first implementation form of the first aspect or the first aspect as such, the processing circuitry is configured to determine, in accordance with the indicated subset, the non-chordal graph representing the tensor network from a universal non-chordal graph representing the tensor network by removing, for each input or output qubit that is not in the indicated subset all edges connecting a vertex that corresponds to the qubit, and all vertices that correspond to the qubit; wherein there is a one to one correspondence between the vertices of the universal non-chordal graph and qubits of the quantum circuit, wherein each qubit of the quantum circuit is either an input qubit, an output qubit, or an intermediate qubit.

In a possible implementation form of the apparatus according to any preceding implementation of the first aspect or the first aspect as such, the processing circuitry is configured to remove, before removing the indices corresponding to the intermediate qubits, that indices from the tensors of the tensor network that correspond to either i) an input qubit that is not in the indicated subset, or ii) an output qubit that is not in the indicated subset.

In a possible implementation form of the apparatus according to any preceding implementation of the first aspect or the first aspect as such, the indices corresponding to either an input qubit that is not in the indicated subset or an output qubit that is not in the indicated subset are removed from the tensor network by setting the indices to respective predetermined values; and/or the indices corresponding to the intermediate qubits are removed from the tensor network by contraction.

According to a second aspect, the disclosure relates to a method for simulating a quantum circuit. The method includes the steps of receiving an indication of a subset of input and output qubits of the quantum circuit, the indicated subset corresponding to an amplitude tensor of the quantum circuit that is to be determined, the amplitude tensor comprising amplitudes for different combinations of states of the qubits of the indicated subset; determining, using a tensor network of the quantum circuit and Restricted Maximum Cardinality Search (RMCS), an elimination order of intermediate qubits within the quantum circuit; and determining the amplitude tensor by removing, successively in accordance with the elimination order, that indices of the tensors of the tensor network that correspond to the intermediate qubits from the tensor network.

In a possible first implementation form of the method according to the second aspect as such, the elimination order is determined iteratively, in reverse order, by selecting from the intermediate qubits, in each step of the iteration, an intermediate qubit that i) has not been selected in any preceding step of the iteration, and ii) corresponds, in a chordal graph representing the tensor network, to a vertex neighboring a maximum number of vertices that correspond to either a) an intermediate qubit that has been selected in any preceding step of the iteration, or b) a qubit in the indicated subset.

In a possible implementation form of the method according to the first implementation form of the second aspect or the second aspect as such, each intermediate qubit uniquely corresponds to a respective index of the tensors, each qubit in the indicated subset uniquely corresponds to a respective index of the tensors, and each index of the tensors uniquely corresponds to either an input qubit, an output qubit, or an intermediate qubit; and/or there is a one to one correspondence between the vertices of the chordal graph and that indices that correspond to either an intermediate qubit or a qubit in the indicated subset.

In a possible implementation form of the method according to the second implementation form of the second aspect or the second aspect as such, the chordal graph representing the tensor network is a chordal completion of a non-chordal graph representing the tensor network that has a minimized maximal clique among chordal completions of said non-chordal graph.

In a possible implementation form of the method according to the preceding implementation or the second aspect as such, the chordal graph is obtained from the non-chordal graph representing the tensor network using an optimized elimination order of the vertices of the non-chordal graph, wherein the chordal graph is obtained by adding edges to said non-chordal graph such that, for each vertex, all neighbors of the vertex that are later in the optimized elimination order than said vertex are a clique in the chordal graph.

In a possible implementation form of the method according to the preceding implementation or the second aspect as such, for each quantum gate of the quantum circuit, there is a tensor of the tensor network that has, for each qubit of the quantum gate that is either an intermediate qubit or in the indicated subset, one index that corresponds to said qubit; for each quantum gate of the quantum circuit, that vertices of the non-chordal graph that correspond to the qubits of said quantum gate are a clique.

In a possible implementation form of the method according to the preceding implementation or the second aspect as such, the determining of the elimination order of the intermediate qubits includes determining the optimized elimination order.

In a possible implementation form of the method according to the preceding implementation or the second aspect as such, the optimized elimination order of the vertices of the non-chordal graph representing the tensor network is determined using an optimization procedure. The optimization procedure minimizes a maximal clique of that graph that is obtained by adding edges to the non-chordal graph such that, for each vertex of the graph, all neighbors of said vertex that are later in the optimized elimination order than said vertex are a clique in the graph.

In a possible implementation form of the method according to the two preceding implementations or the second aspect as such, before the determining of the optimized elimination order, the non-chordal graph is modified by adding, to the non-chordal graph, edges such that the vertices corresponding to the qubits of the indicated subset are a clique.

In a possible implementation form of the method according to the first implementation form of the second aspect or the second aspect as such, the method includes a step of determining, in accordance with the indicated subset, the non-chordal graph representing the tensor network such that i) there is a one to one correspondence between the vertices of the non-chordal graph and that indices of the tensors that correspond to either an intermediate qubit or a qubit in the indicated subset; and ii) for each tensor of the tensor network, the vertices of the non-chordal graph that correspond to said tensor are a clique.

In a possible implementation form of the method according to the first implementation form of the second aspect or the second aspect as such, the method includes a step of determining, in accordance with the indicated subset, the non-chordal graph representing the tensor network from a generic non-chordal graph representing the tensor network by adding i) for each input or output qubit that is in the indicated subset, a single vertex that corresponds to said qubit, and ii) edges such that, for each quantum gate of the quantum circuit, that vertices of the non-chordal graph that correspond to the qubits of said quantum gate are a clique, wherein there is a one to one correspondence between the vertices of the generic non-chordal graph and the intermediate qubits.

In a possible implementation form of the method according to the first implementation form of the second aspect or the second aspect as such, the method includes a step of determining, in accordance with the indicated subset, the non-chordal graph representing the tensor network from a universal non-chordal graph representing the tensor network by removing, for each input or output qubit that is not in the indicated subset all edges connecting a vertex that corresponds to the qubit, and all vertices that correspond to the qubit; wherein there is a one to one correspondence between the vertices of the universal non-chordal graph and qubits of the quantum circuit, wherein each qubit of the quantum circuit is either an input qubit, an output qubit, or an intermediate qubit.

In a possible implementation form of the method according to any preceding implementation of the second aspect or the second aspect as such, the method includes a step of removing, before removing the indices corresponding to the intermediate qubits, that indices from the tensors of the tensor network that correspond to either i) an input qubit that is not in the indicated subset, or ii) an output qubit that is not in the indicated subset.

In a possible implementation form of the method according to any preceding implementation of the second aspect or the second aspect as such, the indices corresponding to either an input qubit that is not in the indicated subset or an output qubit that is not in the indicated subset are removed from the tensor network by setting the indices to respective predetermined values; and/or the indices corresponding to the intermediate qubits are removed from the tensor network by contraction.

The advantages of the methods according to the second aspect are the same as those for the corresponding implementation forms of the apparatuses according to the first aspect.

According to a third aspect, the disclosure relates to a computer program product including instructions stored on a non-transitory storage medium. The computer program product executes, when performed on one or more processors, a method according to the first or second aspect or any possible embodiment of the first or second aspect when executed.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which:

FIG. 1 is a graphical representation of the tensor network $A_{ij}B_{jk}C_{ikl}$ using a traditional graphical tensor network representation;

FIG. 2 is a graphical representation of the tensor network $A_{ij}B_{jk}C_{ikl}$ using an alternative graphical tensor network representation;

FIG. 3 is a graphical representation of the contraction of the index k of the tensor network $A_{ij}B_{jk}C_{ikl}$ and the forming of a new tensor $D_{ijl}$;

FIG. 4a)-g) is a graphical representation of the complete contraction of a tensor network using the elimination order $\pi$=[kjilmn];

FIG. 5a)-g) is a graphical representation of the complete contraction of the tensor network of FIG. 4a) the elimination order $\pi$=[kjilmn] with highlighting of the largest clique that corresponds to a single intermediate tensor;

FIG. 6a)-g) is a graphical representation of the complete contraction of the tensor network of FIG. 4a) using the elimination order $\pi$=[kjilmn] with highlighting of the largest clique that corresponds to a single intermediate tensor;

FIG. 8a)-d) illustrates the exemplary graphical representations of different quantum gates;

Figure 7:
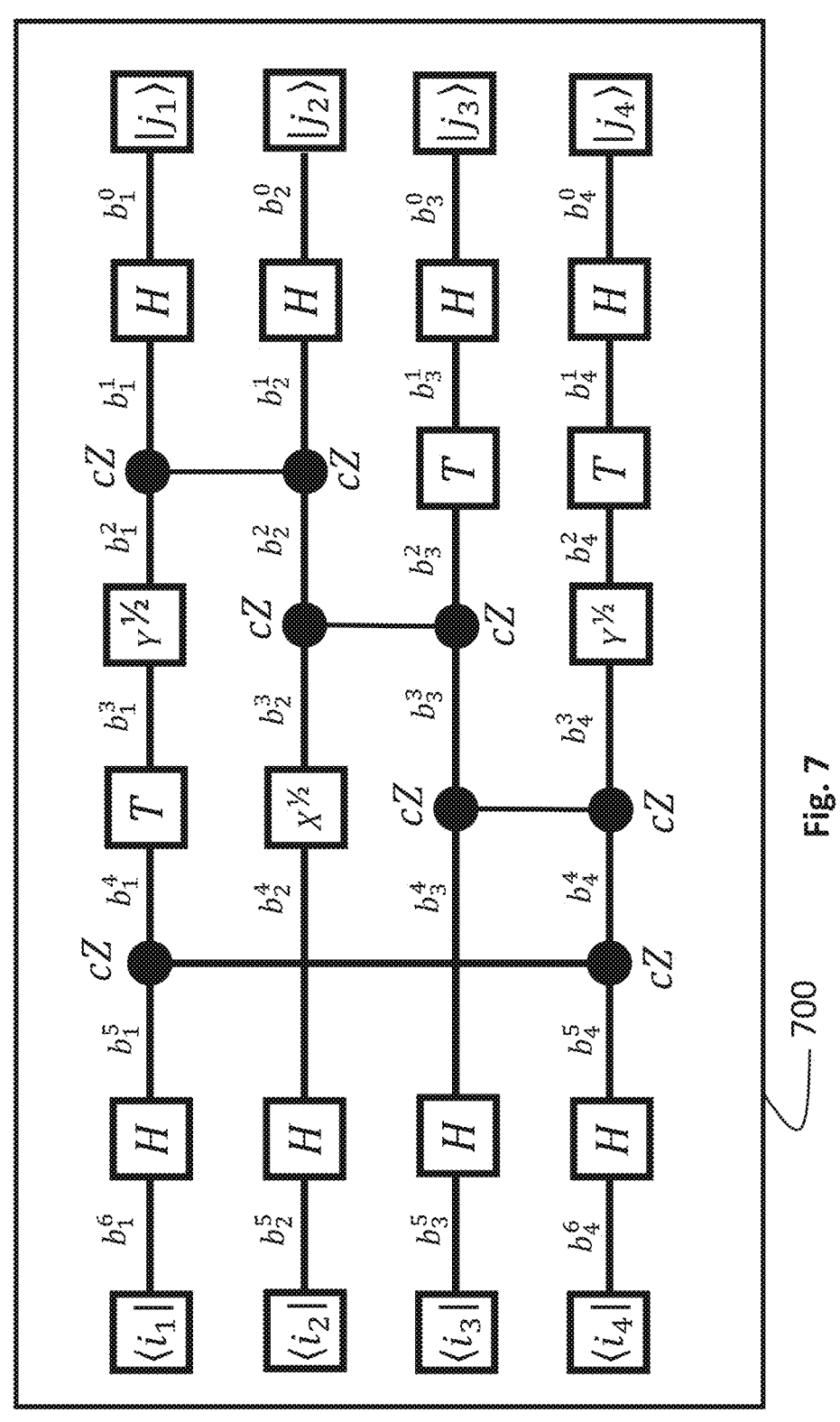
FIG. 7 is a schematic drawing of an exemplary quantum circuit.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units (in other words, modules or circuits), e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

The current disclosure is devoted to the efficient simulation of quantum circuits (digital quantum computers). The task of quantum circuit simulation is necessary for the development of quantum algorithms, as well as for the verification and validation of the upcoming quantum processors.

A quantum computer operates on the state of a collection (e.g. a plurality, a system, or a set) of two-state quantum systems, also called qubits. Unlike an ordinary bit, which can assume only two values, i.e., is either in state "0" or "1"; the state of a qubit is a vector in a two-dimensional complex vector space. It is convenient to express the general state of a qubit as a linear combination (or superposition) of two computational basis states, denoted as $|0\rangle$ and $|1\rangle$, which form an orthonormal basis of said vector space, i.e., satisfy the conditions $\langle 1|0\rangle = \langle 0|1\rangle = 0$, and $\langle 0|0\rangle = \langle 1|1\rangle = 1$. Noteworthy, these conditions leave some freedom of choice of the computational basis states. For instance, the two states $|+\rangle = (|0\rangle + |1\rangle)/\sqrt{2}$ and $|-\rangle = (|0\rangle - |1\rangle)/\sqrt{2}$ form also an orthonormal basis, and may alternatively be used to describe the states of qubits. Representing the computational states as vectors, $$|0\rangle = \begin{pmatrix} 0 \\ 1 \end{pmatrix} \text{ and } |1\rangle = \begin{pmatrix} 1 \\ 0 \end{pmatrix},$$

the state of an arbitrary qubit can then be written as $$|\phi\rangle = \alpha \cdot \begin{pmatrix} 0 \\ 1 \end{pmatrix} + \beta \cdot \begin{pmatrix} 1 \\ 0 \end{pmatrix} = \begin{pmatrix} \beta \\ \alpha \end{pmatrix},$$

where $\alpha$ is the amplitude of the state $|0\rangle$, and B is the amplitude of the state $|1\rangle$. In other words, a qubit can be in a linear combination of the states $|0\rangle$ and $\|1\rangle$. If the state $|\phi\rangle$ satisfies the normalization condition $\langle \phi|\phi\rangle = |\alpha|^2 + |\beta|^2 = 1$, the result of a measurement performed on the qubit (e.g., of a measurement of the spin of an electron) is either 0 with probability $|\alpha|^2$, or 1 with probability $|\beta|^2$.

The state $|\psi\rangle$ of a system of N qubits is specified by $2^N$ amplitudes, or, in other words, is a vector in a $2^N$ dimensional vector space. In analogy to the above, the computational basis states of the N qubit-system can be written in the form $$e_{i_1 \ldots, i_N} = |i_1\rangle \otimes \ldots \otimes |i_N\rangle = |i_1, \ldots, i_N\rangle,$$

where $\otimes$ stays for an outer product of vectors representing the individual qubits, and the indices $i_i$ can assume the values 0 and 1. Thus, the state of an arbitrary system of N qubits can then be written as $$|\psi\rangle = \sum_{i_1=0}^{1} \ldots \sum_{i_1=0}^{1} \psi^{i_1, \ldots, i_N} |i_1, \ldots, i_N\rangle.$$

As can be seen from the above, given a basis $|i_1, \ldots, i_N\rangle$, $|\psi\rangle$ corresponds to a type (N, 0) tensor $\psi^{i_1 \cdots i_N}$ with N (contravariant) indices, $i_1, \ldots, i_N$ (and of order/degree/rank N), where each index can assume two different values, e.g., either 0 or 1. The entries of the tensor $\psi^{i_1 \cdots i_N}$, i.e., the respective values that the tensor $\psi^{i_1 \cdots i_N}$ assumes for combinations of values of the N indices, are the amplitudes of the state $|\psi\rangle$. Each amplitude corresponds, depending on the index values and the basis used to describe said tensor, to a particular state of the system and indicates the probability of observing the system in said particular state. In other words, for each combination of values of the indices $x_1, \ldots, x_N$, where $x_i \in \{0,1\} \forall i$, the absolute square of the amplitude $\psi^{x_1 \cdots x_N}$ of the amplitude tensor $\psi^{i_1 \cdots i_N}$ is the probability of observing, when performing a measurement on a system in the state $|\psi\rangle$, the system in that computational basis state that corresponds to the amplitude $\psi^{x_1 \cdots x_N}$, i.e., in the state $|x_1, \ldots, x_N\rangle$. In other words, the state $|x_1, \ldots, x_N\rangle$ will be observed with probability $|\psi^{x_1, \cdots, x_N}|^2$.

For instance, let us assume we have a 4-qubit state $|\psi\rangle$ and are interested in the probability of observing the qubit-string b=0001, i.e., of observing the first, second, third, and fourth qubit in the state $|0\rangle$, $|0\rangle$, $|0\rangle$, and $|1\rangle$, respectively. In other words, we are interested in the probability $|\psi^{0001}|^2$ of finding the 4-qubit system in the state $$e_{0001} = |0\rangle \otimes |0\rangle \otimes |0\rangle \otimes |1\rangle = |0001\rangle.$$

Then, the amplitude $\psi^{0001}$, which corresponds to the state $|0001\rangle$ (or the qubit-string b) and is the entry of the tensor $\psi^{i_1 \cdots i_N}$ for the index values $i_1=i_2=i_3=0$, $i_4=1$, can be calculated as:

$$\psi^{0001} = \langle e_{0001}|\psi\rangle,$$

which is the inner product between the vectors $|e_{0001}\rangle$ and $|\psi\rangle$.

As far as quantum programs are concerned, the operation of a quantum circuit can be expressed as an action of the circuit's matrix C, which in general in unitary, on the initial state $|\phi\rangle$ of the quantum circuit:

$$|\psi\rangle = C|\phi\rangle,$$

which is followed by a measurement on the final state $|\psi\rangle$ of the quantum circuit.

In order to simulate a quantum computation, one usually evaluates/determines entries of the tensor $\psi^{i_1 \cdots i_N}$ or of the vector $|\psi\rangle$. In this respect, there are different approaches:

In a first approach (full state approach), one obtains all amplitudes of $|\psi\rangle$ at once by applying sparse linear transformations to the amplitude vector $|\psi\rangle$ (full state simulation, [1]):

$$|\psi\rangle = C|\phi\rangle = C_d \cdot C_{d-1} \cdot \ldots \cdot C_1 |\phi\rangle$$

Here, the whole circuit matrix C is expanded as a product of operations represented by (unitary) matrices $C_j$, each performed at a respective corresponding (clock) cycle $j \in [1, \ldots, d]$ of the circuit. However, the straightforward application of gates to the full state vector, as in [1], is hard to optimize. Additionally, large quantities of RAM are required for such programs, which restricts the maximal size of circuits to around 50 qubits on modern hardware. Mostly older programs are based on the sequential application of sparse matrices Ck to the state vector (e.g., the initial state vector $|\phi\rangle$).

In a second approach (single amplitude approach), the individual amplitudes are calculated one by one by evaluating vector-matrix-vector products (e.g., evaluating matrix elements of C):

$$\sigma_k = \langle e_k|\psi\rangle = \langle e_k|C_d \cdot C_{d-1} \cdot \ldots \cdot C_1|\phi\rangle$$

The sparse matrices $C_i$ are outer products of single or two-qubit gates. To utilize the internal structure of $C_i$ it is more convenient to represent them as type (N, N) tensors (with N contravariant and N covariant indices and thus rank 2N) acting on $|\phi\rangle$). In analogy to the state vector $|\psi\rangle$, the circuit matrix can be written as $$C = C^{i_1, \ldots, i_N}_{j_1, \ldots, j_N} |i_1, \ldots, i_N\rangle\langle j_1, \ldots, j_N|$$

where summation over identical indices is assumed, and $|\cdot\rangle\langle\cdot|$ represents an outer product.

The evaluation of a single amplitude, e.g., the calculation of one of the $$C^{i_1, \ldots, i_N}_{j_1, \ldots, j_N},$$

amounts to a contraction (e.g. a full contraction) of a tensor network [2], [3]. In other words, the tensors $\psi^{i_1 \cdots i_N}$ and/or $$C^{i_1, \ldots, i_N}_{j_1, \ldots, j_N}$$

may be obtained by contracting a tensor network. In general, a tensor network may be used to describe a quantum circuit and/or to calculate entries of an amplitude tensor of the quantum circuit. Here, a tensor network is, in general, an expression comprising one or more tensors, for example $A_{ij} \cdot B_{jk} \cdot C_{ikl}$, each of said tensors having a respective set of indices. In general, each different index (in the example i, j, k, and l) may appear on more than one of the tensors of the tensor network. Depending on the context, a contraction over all (different) indices may be implicitly understood, or, explicitly indicated $\Sigma_{ijk} A_{ij} \cdot B_{jk} \cdot C_{ikl}$. In the present disclosure, the summation over an index is also referred to as a contraction of said index. Thus, in contrast to the usual tensor contraction, in which a summation over an index that appears exactly twice is performed, in the present disclosure an index that is contracted may also appear only once or more than two times in the tensor network.

Such codes (implementations) based on tensor network graphs allow more flexibility and can surpass a 50 qubit limit. Their problem, however, is an inefficient handling of diagonal matrices and higher order tensors. In particular, in a traditional tensor notation, there is no difference in representation of a diagonal tensor, e.g., a controlled-Z gate $$cZ_{iijj} = C^{i,j}_{i,j},$$

and a non-diagonal tensor $$U_{ijkl} = C^{i,k}_{j,l}.$$

Here a diagonal tensor is a tensor for which $$C^{i_1, \ldots, i_N}_{j_1, \ldots, j_N} \propto \delta(i_1, j_1) \cdot \ldots \cdot \delta(i_N, j_N), \text{ i.e. for which}$$

$$C = C^{i_1, \ldots, i_N}_{i_1, \ldots, i_N} |i_1, \ldots, i_N\rangle\langle i_1, \ldots, i_N|,$$

and which thus can be represented by a diagonal matrix acting on a N qubit-system.

Additionally, it is harder to adapt programs based on tensor network graphs to efficiently utilize modern parallel hardware.

From an arbitrary quantum circuit a corresponding tensor network may be obtained as follows. First, said quantum circuit is expressed in terms of one-qubit and two-qubit gates, for instance in terms of Hadamard gates, controlled X gates (cX, also called controlled NOT gate, CNOT), and $\pi/8$ gates, which is always possible to an arbitrary accuracy. However, it is noted that this is merely an illustrative example and the present disclosure is not limited to a particular set of gates used to describe the quantum circuit. In general, any set of gates, even n-qubit gates with arbitrary n (in particular also gates with n>2), may be used to describe the quantum circuit and the advantages of the present disclosure can be achieved.

Then, the individual one-qubit and two-qubit gates are expressed as $$U_{d1} = \Sigma_{i \in (0,1)} \psi_{Ud1}(i)|i\rangle \langle i| \qquad \text{(diagonal one-qubit gate),}$$

$$U_{n1} = \Sigma_{i, j \in (0,1)} \psi_{Un1}(i)|i\rangle \langle j| \qquad \text{(non-diagonal one-qubit gate),}$$

$$U_{d2} = \pi_{i, j \in (0,1)} \psi_{Ud2}(i, j)|i, j\rangle \langle i, j| \qquad \text{(diagonal two-qubit gate), and}$$

$$U_{n2} = \Sigma_{i, j, k, l \in (0,1)} \psi_{Un2}(i, j, k, l)|i, j\rangle \langle k, l| \qquad \text{(non-diagonal two-qubit gate),}$$

where the $\psi_{U_{xx}}$ can, in general, be represented as unitary matrices and depend on the particular quantum gate. Thus, in general, for each quantum gate of the quantum circuit, there may be a tensor of the (uncontracted) tensor network. In general, there may (initially, i.e., before contractions) be a one-to-one correspondence between quantum gates and tensors of the tensor network. However, after performing contractions of indices, a new tensor obtained from than one tensors of the uncontracted tensor network may correspond to more than one quantum gate.

Furthermore, as can be seen from the above formulas, even diagonal quantum gates introduce new variables/qubit states. However, using the orthonormality of the computational basis, these qubit states can be immediately removed from a tensor expression of a quantum circuit. They, are in the following, as further explained below, referred to as non-unique qubit states. For instance, a diagonal one-qubit gate $U_{d1}$ followed by a non-diagonal one-qubit gate $U_{n1}$ can be simplifies as $$U_{n1} U_{d1} = \Sigma_{i, \; j, \; k \in (0,1)} \psi_{Un1}(j, \; k) \psi_{Ud1}(i)|j\rangle \langle k|i\rangle \langle i| = \Sigma_{i, j \in (0,1)} \psi_{Und1}(j, i)|j\rangle \langle i|,$$

where the $\psi_{Und_1}(j, i) = \psi_{U_{n1}}(j, i) \psi_{U_{d1}}(i)$, may be considered to correspond to $U_{d1}$ and the $U_{n1}$ gate.

The circuit tensor $$C^{i_1, \ldots, i_N}_{j_1, \ldots, j_N} = \langle i_1, \ldots, i_N | C | j_1, \ldots, j_N \rangle$$

of a quantum circuit operating on N qubits can then be written as a sum over Boolean variables b, which assume the values 0 and 1, according to $$C^{i_1 \ldots, i_N}_{j_1 \ldots, j_N} = \sum_{\{b_1^0, \ldots, b_1^{d_0}, \ldots, b_N^0, \ldots, b_N^{d_N}\}} \delta\left(i_1, b_1^{d_1}\right) \ldots$$

$$\delta\left(i_N, b_N^{d_N}\right) \psi_1 \ldots \psi_\mu \delta(j_1, b_1^0,) \ldots \delta(j_N, b_N^0)$$

Here, one may assume that non-unique qubit states may already been removed, i.e., the sum runs only over variables $$b_k^i$$

that correspond to unique qubit states (otherwise, some of the functions $\psi_1$ would comprise delta functions $$\delta\left(b_k^i, b_m^n\right)$$

and the sum would run over non-unique qubit states as well).

It is noted that N may also be the number of output qubits of the circuit that the number of input qubits and the number of output qubits may be the same. Furthermore, for each of the Boolean variables $$b_k^i,$$

the subscript k enumerates the qubits (e.g., the enumerates horizontal lines in FIG. 7; the vertical lines being those between two dots), and the superscript l enumerates new variables introduced along the world line (e.g., along a qubit line in a graphical representation of a quantum circuit as in FIG. 7). In other words, for all $k \in \{1, 2, \ldots, N\}$, the variables $$b_k^0, \ldots, b_k^{d_N}$$

correspond to the k-th qubit. In particular, in accordance with the fact that the amplitude $$C^{i_1, \ldots, i_N}_{j_1, \ldots, j_N}$$

corresponds to the k-th qubit being in the initial/input state $$|i_k^0\rangle$$

and final/output state $$\left|j_k^{d_k}\right\rangle,$$

there are, for each qubit, two respective Kronecker deltas, $$\delta\left(j_k, b_k^0\right) \text{ and } \delta\left(i_k, b_k^{d_k}\right)$$

which the values of $$b_k^0 \text{ and } b_k^{d_k}$$

in the tensors $\psi_j$ to the correct value. It is also noted that the $d_1, \ldots, d_N$ may in general be mutually different. Furthermore, the remaining variables $$b_k^l,$$

$l \in \{1, 2, \ldots, d_k-1\}$ correspond to (unique) intermediate qubit states.

This is also illustrated in FIG. 7, which is explained in more detail below. However, please note that FIG. 7 shows non-unique qubit states and unique qubit states.

In the above, we took the point of view that all horizontal that are labelled with a b having the same subscript i correspond to a single/same qubit. In other words, the state $$|b_k^l\rangle$$

is considered to correspond to the l-th state of the k-qubit (for instance, $$|b_1^0\rangle \text{ and } |b_1^6\rangle$$

to be the input and output state of the first qubit, respectively).

However, in the present disclosure the input state $$|b_k^0\rangle$$

of the k-th, the output state $$|b_k^{d_k}\rangle$$

of the k-th qubit, and the intermediate states $$|b_k^l\rangle, l \in \{1, 2, \ldots, d_k - 1\},$$

of the k-th qubit are referred to as mutually different qubits. In particular, we will generally adopt the point of view that, in the above formula for $$C_{j_1,\ldots,j_N}^{i_1,\ldots,i_N},$$

the remaining variables $$b_k^l, l \in \{1, 2, \ldots, d_k - 1\}$$

correspond to intermediate qubits. As further explained below, this is merely a question of wording.

Moreover, in the above formula, each of the functions $\psi_1, \ldots, \psi_\mu$ is one of the functions $\psi_{U_{d1}}, \psi_{U_{n1}}, \psi_{U_{d2}}$, and $\psi_{U_{n2}}$, and thus depends on one, two, or four of the Boolean variables. Said functions may then be rewritten as tensors according to $$A_i^{(U_{d1})} = \psi_{U_{d1}}(i),$$

$$A_{ij}^{(U_{n1})} = \psi_{U_{n1}}(i, j),$$

$$A_{ij}^{(U_{d2})} = \psi_{U_{d2}}(i, j),$$

and $$A_{ijkl}^{(U_{n2})} = \psi_{U_{n2}}(i, j, k, l).$$

It is also noted that, in general, input and output may also be referred to as external qubits.

In particular, diagonal one-qubit gates, non-diagonal one-qubit gates, diagonal two-qubit gates, and non-diagonal two-qubit gates are represented as tensor of rank 1, 2, 2, and 4 respectively. It is also noted that, since at this point the computation of the amplitude tensor (or particular amplitude(s) of said tensor) is a mere multiplication and addition of complex numbers, it not necessary to distinguish between upper and lower indices of the tensors (e.g., we may write $C_{i_1, \ldots, i_N, j_1, \ldots, j_N}$ instead of $$C_{j_1,\ldots,j_N}^{i_1,\ldots,i_N}).$$

It is further noted that, in order to obtain one of the amplitudes $$C_{j_1,\ldots,j_N}^{i_1,\ldots,i_N},$$

a full contraction of the tensor network, which is the summation over all Boolean variables/tensor indices, may have to be performed. In general, the amplitude expression (e.g., the tensor network) may also be built using the known techniques, e.g., from [3], [4].

Finally, there are codes based on graphical models (e.g., of a tensor network corresponding to a given quantum circuit), which overcome previous problems. These codes make use of tensor network graphs to optimize the evaluation. In other words, in these graphical models, the tensor networks are expressed as graphs, advantageously undirected and/or simple graphs, which is explained below with reference to FIGS. 1 to 3.

FIG. 1 illustrates a first graphical representation (here also referred to as the traditional representation) of the tensor network $\Sigma_{ijk} A_{ij} \cdot B_{jk} \cdot C_{ikl}$. As can be seen, in this representation, nodes denote multidimensional arrays, and edges denote their indices. Vectors, matrices and higher order tensors are represented by nodes with 1, 2 and more edges respectively. Connected edges mean contractions (summations) over respective indices.

In other words, in the traditional representation/graph, vertices representing tensors that have a common index are connected by an edge. Furthermore, for each tensor in the tensor network, there may be a vertex in a corresponding traditional graph. In general, there is a one-to-one correspondence of vertices and tensors. However, for one index of the tensor network there may be multiple corresponding edges. For instance, if an index appears on three tensors, there will be three edges connecting vertices that correspond said three tensors. Furthermore, each two vertices that correspond to tensors that share an index, are connected by an edge. Thus, the tensors that share an index correspond to a clique (fully connected subgraph) in the traditional graph.

Here it is noted that, in general, "a subset of vertices is/forms a clique" may mean that each vertex of said subset is connected with each other vertex of said subset. It is further noted that the terms "connected" "joined" or "linked" in expressions of the form "two vertices are connected" are here used interchangeably. Furthermore, the terms "node" and "vertex" are used interchangeably. Moreover, a "neighbor" of a first vertex is another, second vertex that has a common edge with said first vertex; and a vertex neighboring a first vertex, is a neighbor of the first vertex.

In the illustration of the traditional representation in FIG. 1, since there are three tensors (A, B, and C) in the example expression $\Sigma_{ijk}A_{ij}\cdot B_{jk}\cdot C_{ikl}$, there are three vertices in the graph, each corresponding to a respective one of said tensors. Furthermore, since the tensors A and B share the index j, the vertices that correspond to the tensors A and B are connected by an edge that corresponds to index j. Similarly, since the tensors A and C share the index i, the vertices that correspond to the tensors A and C are connected by an edge that corresponds to the index i. Finally, since the tensors B and C share the index k, the vertices that correspond to the tensors B and C are connected by an edge that corresponds to index k.

FIG. 2 illustrates a different graphical representation also used in [3] (here also referred to as graphical model) of the same example expression $\Sigma_{ijk}A_{ij}\cdot B_{jk}\cdot C_{ikl}$. In this notation, (unique) indices are represented by nodes, and tensors are represented by cliques (fully connected subgraphs).

In other words, in the graphical representation, vertices of indices that have a common tensor are connected by an edge. Furthermore, for each unique index in the tensor network, there may be a vertex in a corresponding graphical representation. In general, there is a one-to-one correspondence of vertices and unique indices.

It is noted that the term "unique indices" refers to mutually different indices. That is to say, multiple tensors may have an index in common, and an index appearing on multiple tensors counts as only one unique index. For instance, the example expression $\Sigma_{ijk}A_{ij}\cdot B_{jk}\cdot C_{ikl}$ has the four unique indices i, j, k, and l. In general, when clear from the context, the term "unique" may be omitted herein.

However, there is in general no one to one correspondence between the tensors and the edges of the graph. In other words, for one tensor of the tensor network there may be multiple corresponding edges. For instance, if a tensor has more than three mutually different indices, there will be an edge for each pair of vertices corresponding to said different indices. All of these edges correspond to said tensor (and vice versa). Thus, each tensor corresponds to a clique (fully connected subgraph) in the graphical model.

In the illustration of the graphical model in FIG. 2, since there four unique indices in the example expression $\Sigma_{ijk}A_{ij}\cdot B_{jk}\cdot C_{ikl}$ (i, j, k, and l), there are four vertices in the graph, each corresponding to the respective one of said indices. Furthermore, since the tensor A has the indices i and j, the vertices that correspond to the indices i and j are connected by an edge that corresponds to the tensor A. Similarly, since the tensor B has the indices j and k, the vertices that correspond to the indices j and k are connected by an edge that corresponds to the tensor B. Finally, since the tensor C has the indices i, k, and 1, the vertices that correspond to the indices i, k, and l are a clique, all edges of said clique corresponding to the tensor C. In other words, the edge connecting the vertices that correspond to the indices i and k, the edge connecting the vertices that correspond to the indices k and 1, as well as the edge connecting the vertices that correspond to the indices i and 1 all correspond to the tensor C. In the graph, the tensor C is thus represented by all three edges.

Henceforth, the graphical model is used.

The contraction of an index corresponds to the removal of the node in a graph, and to the introduction of connections between all its neighbors. This is illustrated in FIG. 3. More specifically, FIG. 3 shows the contraction of the index k in the example expression $\Sigma_{ijk}A_{ij}\cdot B_{jk}\cdot C_{ikl}$. In particular, the graph on the left-hand side of FIG. 3 shows the (uncontracted) graph corresponding to the example expression $\Sigma_{ijk}A_{ij}\cdot B_{jk}\cdot C_{ikl}$, and the right-hand side shows the contracted graph obtained by contracting the index k.

It is noted that, in general, contraction of a tensor network refers to removing one or more indices by performing the corresponding summation(s). In analogy, the contraction of an index of a tensor network means removing the index by performing the summation over said index. For instance, in the example expression $\Sigma_{ijk}A_{ij}\cdot B_{jk}\cdot C_{ikl}$, the contraction of the index k corresponds to performing the summation over k:

$$\sum_{ijk}A_{ij}\cdot B_{jk}\cdot C_{ikl} = \sum_{ij}A_{ij}\cdot D_{ijl}$$

As can be seen in the contracted tensor network $\Sigma_{ij}A_{ij}\cdot D_{ijl}$, there is no index k.

The new tensor $D_{ijl}$ is explicitly given as $D_{ijl}=\Sigma_{k}B_{jk}\cdot C_{ikl}$. In general, a contraction of an index may yield a new tensor. Thereby, all tensors sharing the contracted index may be merged into the new tensor. Thus, in general, a contraction may also remove all tensors from the tensor network that have the contracted index. In other words, these tensors will not appear in the contracted tensor network.

A new clique represents a new tensor, formed after the contraction of the respective index. In other words, in the contracted tensor network, there is a new tensor, where "new" means that a same/identical tensor is not present in the tensor network before contraction. The indices of said new tensor correspond to the vertices of the neighbors of that vertex that corresponds to the contracted index.

For instance, as can be seen in the example illustrated in FIG. 3, the new clique is formed by the vertices i, j, and l, where (all) the edges between said indices correspond to the new tensor D. In general, all neighbors of the removed node may become (e.g., if they not already are) a clique in the contracted graph.

In general, the evaluation of the amplitude expression $\sigma_{k}=\langle e_{k}|\psi\rangle =\langle e_{k}|C_{d}\cdot C_{d-1}\ldots\ldots C_{1}|\phi\rangle$ amounts to the complete contraction of the corresponding tensor network. In graph terms, this corresponds to the elimination of all nodes in the graph. As for instance shown in [2], an optimal sequence of contractions can be calculated through the tree decomposition of the expression's graph. The dimension of the maximal intermediate tensor is given by the treewidth. Thus the treewidth corresponds to the quality of the solution (the elimination sequence).

In the following, the use of graphical models in the analysis of complete tensor network contractions is now demonstrated with reference to FIG. 4 and the example expression $$\sum_{ijklmn}A_{ij}\cdot B_{jk}\cdot C_{ikl}\cdot D_{km}\cdot E_{ln}\cdot F_{mn} = \sigma$$

The full contraction of this tensor network may be performed by going through the following steps $$1) \; \Sigma_i A_{ij} C_{ikl} = T^1_{jkl}$$

$$2) \; \Sigma_j B_{jk} T^1_{jkl} = T^2_{kl}$$

$$3) \; \Sigma_k D_{km} T^2_{kl} = T^3_{lm}$$

$$4) \; \Sigma_l E_{ln} T^3_{lm} = T^4_{nm}$$

$$5) \; \Sigma_m T^4_{nm} F_{mn} = T^5_n$$

$$6) \; \Sigma_n T^5_n = \sigma$$

In particular, in steps 1), 2), 3), 4), 5), and 6) a contraction of the index i, j, k, l, m, and n is performed respectively. Furthermore, the graph obtained after step 1), 2), 3), 4), 5), and 6) is illustrated in FIG. 4. b), c), d), e), f), and g), respectively (FIG. 4a) illustrates the original/uncontracted graph). In each step, the intermediate (tensor network) expression is summed over a single variable (index), which is removed from the tensor network, and the corresponding node is removed from the graph. The cliques in the graphical model are intermediate tensors T in the sequence of contractions. In other words, in each step of the elimination step, a new tensor T may be formed. If such a new tensor T has an index that is contracted in a following step of the elimination sequence, the said new tensor is referred to as an intermediate tensor.

However, the numerical cost of the operations crucially depends on the size of the intermediates, or the size of maximal cliques in the graphical model. For instance, to evaluate an intermediate tensor T with K variables/indices of size L (e.g., assuming L different values when performing the summation) one may have to spend $L^{K+1}$ multiplications (e.g., when two tensors enter the intermediate tensor). Furthermore, the resulting intermediate tensor will have $L^K$ entries. Furthermore, a virtual tensor of rank K+1 may be formed. Here and in the following, the term "virtual tensor" refers to a tensor that may be built in the computer memory during performing the contraction of an index. More generally, term "virtual tensor" refers to the computational cost and memory requirements required for performing a contraction step.

For instance, in the above step 1), the intermediate tensor $$T^1_{jkl},$$

which has 3 indices of size 2, is evaluated. This may require $2^4=16$ multiplications and $2^3=8$ additions. This may be implemented by first building/computing first a virtual tensor $$V^1_{ijkl} \equiv A_{ij} C_{ikl},$$

which is of size 4. Here, each of the 16 entries of the virtual tensor corresponds to the result of the respective multiplication. Then, the virtual tensor may be contracted according to $$\Sigma_i V^1_{ijkl} = T^1_{jkl}.$$

Different sequences of contractions may lead to different intermediates (but the same result). In particular, the complexity of the computation (e.g., represented by the memory/RAM required to perform the amplitude calculation) crucially depends on the size of maximal cliques in the intermediate graphs. Thus, the analysis of tensor network graphs can be used to efficiently perform the simulation of quantum circuits.

It is noted that the terms "intermediate graphs" and "intermediate tensor networks" of an elimination order refers to those graphs/tensor networks obtained after performing, in accordance with said elimination order, the first one or more—but not all—of said two or more contractions. The intermediate graphs do not include the original/uncontracted graph and the final graph. For instance, in FIG. 4 the graphs b), c), d), e), f) are the intermediate graphs. Furthermore, it is noted that the terms "ordering of nodes", "order of contractions", "sequence of contractions", "elimination order", "contraction order", "elimination sequence", "contraction sequence", and the like are used interchangeably. Moreover, apart from external qubits that may have already been removed from a tensor network/graphical model representing a quantum circuit, there is in general a one-to-one-to-one correspondence between qubits, unique indices, and vertices. Therefore, elimination order of qubits corresponds to an elimination order of vertices as well as to a contraction order of indices (and vice versa). Therefore, the terms "elimination sequence of qubits", "elimination sequence of indices", "elimination sequence of vertices", and the like are used interchangeably.

It is further noted that, in general, in an elimination order each vertex/index may only appear once. Thus, in general, an elimination order of a subset $C \subseteq V$ of vertices V of a graph G (V, E) with vertices V and edges E is a bijection $\pi$: $C \rightarrow \{1, 2, \ldots, |C|\}$. Alternatively, $\pi$ can be considered to be a set of pairs of vertices and indices:

$$\pi = \{(c_i, i)\}_{i=1}^{|C|},$$

where $C=\{c_1, c_2, \ldots, c_{|C|}\}$. Furthermore, we may express an elimination order of indices of a set of indices $I=\{i_1, i_2, \ldots, i_{|I|}\}$, which formally is a bijection $\pi:I \rightarrow \{1, 2, \ldots, |I|\}$, as $\pi=[\pi^{-1}(1)\pi^{-1}(2) \ldots \pi^{-1}(|I|)]$, (e.g., such an expression may read $\pi=[jlmikn]$). Moreover, it is noted that a graph here generally is an ordered pair G (V, E) of a set of vertices $V=\{v_1, v_2, \ldots, v_{|V|}\}$ and a set of edges $E=\{e_1, e_2, \ldots, e_{|E|}\}$, where each edge corresponds to a pair of vertices of said graph $e_i=\{v_{e_i}^{(1)}, v_{e_i}^{(1)}\}$.

In general, the contraction of two or more indices may be performed in any order. That is to say, independently of the order, after contracting all of said two or more indices the same tensor network and the same graphical model will be obtained. In short, any order yields the same result. However, the intermediate graphs and tensor networks in general depend on the order in which the contractions are performed.

In other words, different elimination sequences result in intermediates of different dimension, for instance, in intermediate tensors of different rank and/or different intermediate graphs. This is illustrated in FIG. 5 and FIG. 6, which correspond to two different elimination orders. More specifically, FIG. 5 corresponds to the elimination sequence $\pi=[ijklmn]$, with the same steps as in FIG. 4, and FIG. 6 corresponds to the elimination sequence $\pi=[kjilmn]$.

In FIG. 5 and FIG. 6, the cliques corresponding to largest intermediates (e.g., the largest intermediate tensor) are highlighted by shaded areas. In other words, the shaded areas highlight vertices corresponding to the indices of that intermediate tensor (newly formed) that has the maximal rank among the intermediate tensor in the respective elimination sequence. More specifically, the highlighted set in FIG. 5 $b$) corresponds to the tensor $$T_{jkl}^1$$

formed in step 1) above. Similarly the highlighted set in FIG. 6 $b$) would correspond to a new tensor $$T_{ijlm}^1$$

formed in the first step of the elimination sequence $\pi$=[kjilmn].

Since the maximal rank of the intermediate tensors corresponds (e.g., is equal) to the maximal size of a clique that corresponds to a single intermediate tensor, the maximal size of cliques in the elimination sequence that corresponds to a single intermediate tensor is particularly relevant for the computational complexity of an elimination sequence.

For instance, assume that an index that appears once on each of 3 initial tensors of rank $r_1$, $r_2$, and $r_3$, respectively, is contracted. The resulting tensor, which may be an intermediate tensor, will have rank $r=1+r_2+r_3-3$. However, whereas only $2^{r_1}+2^{r_2}+2^{r_3}$ complex numbers are required to describe all 3 initial tensors, the resulting tensor requires $2^{r_1+r_2+r_3-3}$ complex numbers, which, in general, may be more than the original $2^{r_1}+2^{r_2}+2^{r_3}$ complex numbers.

The sequence of variable/index eliminations, which corresponds to the smallest computational complexity will thus have intermediate tensors with the smallest possible maximal rank. In the graphical model, the elimination sequence that corresponds to the smallest possible intermediate tensors may be calculated from a tree decomposition of the initial graph, e.g., from a graph corresponding to the uncontracted tensor network).

The tree decomposition of a graph G can be formulated as finding such a numeration of nodes that the size of the maximal clique (or the maximal treewidth) in the elimination sequence is minimal. As explained below, such an elimination sequence may be used to construct from the initial graph a chordal graph that has a minimal treewidth (or minimal maximal clique) among chordal graphs that can be constructed from said initial graph.

It is noted that, strictly speaking, only an elimination sequence which corresponds to smallest possible intermediate tensors and/or corresponds to the smallest possible treewidth of the resulting chordal graph is an optimal elimination sequence. In other words, strictly speaking, among all elimination sequences that eliminate the same two or more nodes of a given graph, the maximal clique (e.g., corresponding to a single intermediate tensor) in the intermediate graphs of an optimal elimination order is minimal. In general, there may be more than one optimal elimination order that minimizes the maximal rank of the intermediate tensors.

However, in particular in view of the fact that finding an optimal elimination order is an NP-Hard problem, in real applications the optimal elimination order will frequently be not a truly optimal elimination order, but only some approximation. In the present disclosure, such an approximation is also referred to as an optimized elimination order. In general, an optimized elimination sequence may be the result of some (e.g., heuristic) optimization process and not necessarily actually minimizes the maximal clique in the resulting chordal graph and/or minimizes the maximal intermediate tensor. In consequence, the chordal graph constructed using an optimized elimination sequence may have only a substantially minimal treewidth or, in other words, may have only a minimized treewidth. However, in some embodiments, the optimized elimination order is an optimal elimination order. In other words, the optimization procedure used to determine the optimized elimination order may be a procedure that surely yields an optimal elimination order.

The construction of a graphical model of a quantum circuit is now illustrated with reference to FIGS. 7 to 9.

FIG. 7 illustrates an exemplary 4-qubit quantum circuit 700. As can be seen, after each quantum gate, the respective qubit-line (i.e., a horizontal line; the vertical lines being those between two dots) has been labeled with a different b-label (the upper index has been increased by one). It is noted that the time order of operations in FIG. 7 is from the right to the left (later time means higher upper index).

In particular, each of the lines denoted as $$b_1^0, b_2^0, b_3^0, \text{ and } b_4^0$$

corresponds to one of the four input qubits of the quantum circuit 700, and each of the lines denoted as $$b_1^6, b_2^5, b_3^5,$$

and b corresponds to one of the four output qubits of the quantum circuit 700.

The remaining qubit lines (horizontal lines) correspond to intermediate qubits. Here, in general, the term "intermediate qubit" or "internal qubit" refers to a two-state quantum system used to describe the quantum circuit that corresponds neither to an input nor an output qubit (state). In other words, an intermediate qubit is a qubit between two (non-diagonal) quantum gates in (or within) a quantum circuit (e.g., a virtual qubit). However, only a non-diagonal quantum gate may introduce a new unique qubit states and, thus, a new intermediate qubit. In other words, if a given qubit is in either state $|0\rangle$ or $|1\rangle$ before a diagonal quantum gate, said given qubit will be in the same state after said diagonal quantum gate (only the phase of said state may have changed). Thus, if a two indices $$b_k^j \text{ and } b_m^n$$

correspond to the same qubit state.

For instance, in FIG. 7, the line labelled as $$b_1^2$$

corresponds to the same intermediate qubit as the line labelled as $$b_1^1,$$

and the lines labelled as $$b_1^4 \text{ and } b_1^5$$

correspond to the same intermediate qubit as the line labelled as $$b_1^3.$$

Similarly the lines $$b_2^2 \text{ and } b_2^3$$

correspond to the
same intermediate qubit as the line labelled as $$b_2^4,$$

and so forth.

Furthermore, the boxes labelled as H indicate Hadamard gates, which are non-diagonal one-qubit gates; the boxes labelled as $X^{1/2}$ indicate $X^{1/2}$ gates, which are non-diagonal one-qubit gates; the boxes labelled as $Y^{1/2}$ indicate $Y^{1/2}$ gates, which are non-diagonal one-qubit gates; and the boxes labelled as T indicate T gates (also referred to as $\pi/8$ gates), which are diagonal one-qubit gates.

Finally, each pair of dots (labelled as cZ) connected by a vertical line indicates a controlled Z gate, which is diagonal two-qubit gate. The two qubits lines connected by a cZ gate are the qubits on which said cZ gates acts. Here, one of these qubits (for instance, the upper qubit) is the control qubit, and the other qubit is the target qubit on which a Z operation may be performed depending on the state of the control qubit.

FIG. 8 $a$) to $d$) illustrate exemplary representations of diagonal one-qubit gates, non-diagonal qubit gates, diagonal qubit gates, and non-diagonal two-qubit respectively. FIG. 8 $a$) to $d$) thus correspond to the above generic expressions $U_{d1}$, $U_{n1}$, $U_{d2}$, and $U_{n2}$, respectively. The respective left-hand sides of FIG. 8 illustrate exemplary representations that may be used in schematic drawing of a quantum circuit, and the respective right-hand sides illustrate exemplary representations that may be used in the graphical model.

As can be seen, in the graphical model, the qubits of the quantum gates are represented as vertices, and the vertices corresponding to the qubits of a quantum gate are represented as a clique. As indicated in FIG. 8, (all) the edges of the clique corresponding to a quantum gate $U_{xx}$ correspond to the tensor $\psi\upsilon_{xx}$ of said quantum gate. In other words, in general, for each quantum gate of the quantum circuit, those vertices of the non-chordal graph that correspond to the qubits of said quantum gate form a clique.

It is noted that correspondingly, for each quantum gate of the quantum circuit, there may be a corresponding tensor of the tensor network. Said tensor may have, for each qubit of said quantum gate that is either an intermediate qubit or in the indicated subset (an indicated qubit), one index that corresponds to said qubit. The present disclosure is not limited to any particular quantum gate representation. The quantum circuit may in general be represented by elementary gates and by composite gates which include more than one elementary gates.

Figure 9:
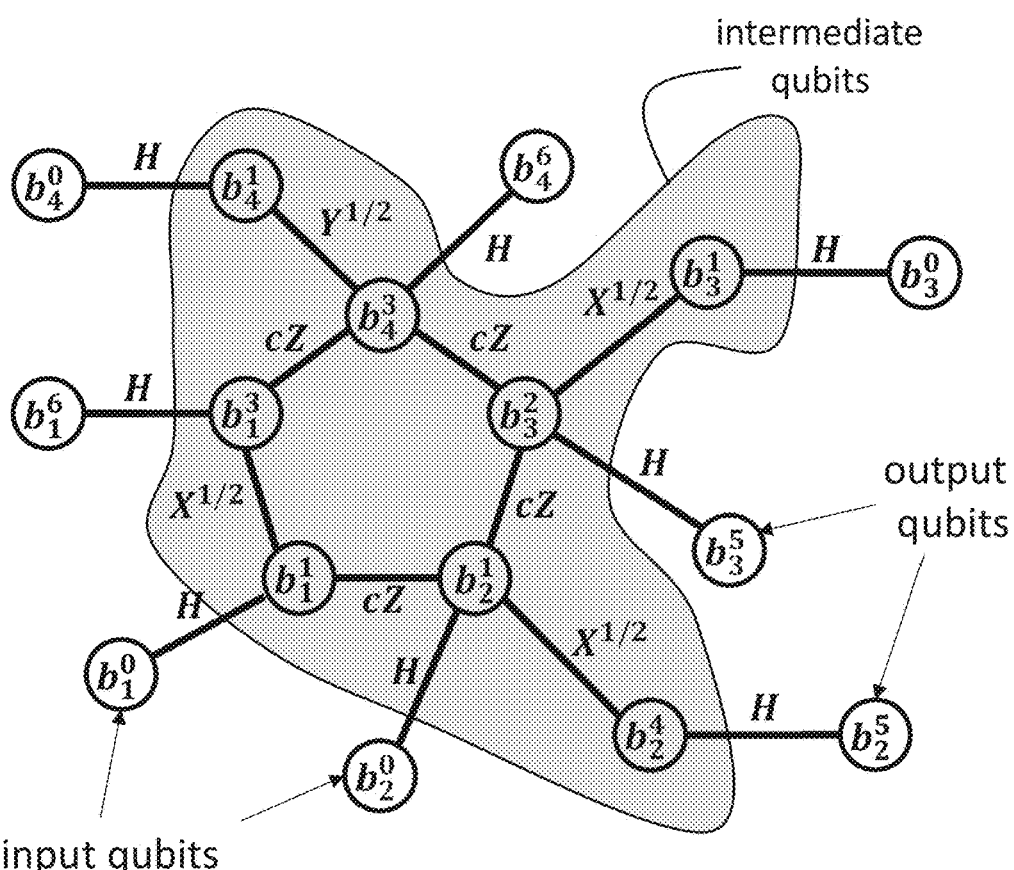
FIG. 9 is a graphical representation of the exemplary quantum circuit of FIG. 7.

FIG. 9 illustrates a graphical model corresponding to the quantum circuit shown in FIG. 7. As can be seen, there is one vertex for each non-equivalent qubit state. In other words, there is one vertex for each (unique) qubit of the quantum circuit. Here it should be noted that the term "qubit of the quantum circuit" in general refers to the input qubits of the quantum circuit, the output qubits of the quantum circuit and the intermediate qubits (within the quantum circuit).

As explained above, graphical models offer a more economical representation of the diagonal quantities and reveal computational savings in the evaluation of the expression.

However, up to now, graphical model based approaches have been mainly applied to the evaluation of a single amplitude at a time.

In view of the above, an aim of the present disclosure is to facilitate the efficient evaluation/computation, based on graphical models, of any subtensor of the amplitude tensor of the circuit matrix of a quantum circuit (e.g., any subset of entries/amplitudes).

It is noted that the term "subtensor" in general refers to a tensor that can be obtained from one of the amplitude tensors $\psi^{i_1 \cdots i_N}$ or $$C_{j_1, \ldots, j_N}^{i_1, \ldots, i_N}$$

by setting indices of the respective tensor to 0 or 1. Thereby, for each index set in this way, the state of a particular input our output qubit of the quantum circuit is specified. Thus, in other words, the entries of a subtensor of a tensor are a subset of the entries of said tensor.

It is further noted that, if the initial state $|\phi\rangle$ corresponding to $|\psi\rangle$ is a basis vector of the computational basis, $\psi^{i_1 \cdots i_N}$ is actually a subtensor of the circuit tensor $$C_{j_1, \ldots, j_N}^{i_1, \ldots, i_N}.$$

Thus, the present disclosure facilitates in particular, given an initial state $|\phi\rangle$ of the qubit-system, the efficient computation of any subtensor of the corresponding amplitude tensor $\psi^{i_1 \cdots i_N}(|\phi\rangle)$.

Therefore, according to a first embodiment, an apparatus for simulating a quantum circuit is provided. The apparatus further includes a processing circuitry configured to receive an indication of a subset of qubits, the qubits being the input and the output qubits of the quantum circuit. The indicated subset corresponds to an amplitude tensor of the quantum circuit that is to be determined, wherein the amplitude tensor comprises amplitudes for different combinations of states of the qubits of the indicated subset. The processing circuitry is further configured to determine, using a tensor network of the quantum circuit and Restricted Maximum Cardinality Search (RMCS), an (optimal/optimized) elimination order of intermediate qubits within the quantum circuit. Moreover, the processing circuitry is configured to determine the amplitude tensor by removing, successively in accordance with the elimination order, that indices of the tensors of the tensor network that correspond to the intermediate qubits from the tensor network.

Furthermore, according to a second embodiment, a method for simulating a quantum circuit is provided. The method comprises a step of receiving an indication of a subset of input and output qubits of the quantum circuit, the indicated subset corresponding to an amplitude tensor of the quantum circuit that is to be determined, the amplitude tensor comprising amplitudes for different combinations of states of the qubits of the indicated subset. Furthermore, the method comprises a step of determining, using a tensor network of the quantum circuit and Restricted Maximum Cardinality Search (RMCS), an elimination order of intermediate qubits within the quantum circuit. Moreover, the method comprise a step of determining the amplitude tensor by removing, successively in accordance with the elimination order, that indices of the tensors of the tensor network that correspond to the intermediate qubits from the tensor network.

Moreover, according to a third embodiment, a computer program product including instructions stored on a non-transitory storage medium is provided. Said computer program performs, when executed on one or more processors the method according to the second embodiment.

Figure 10:
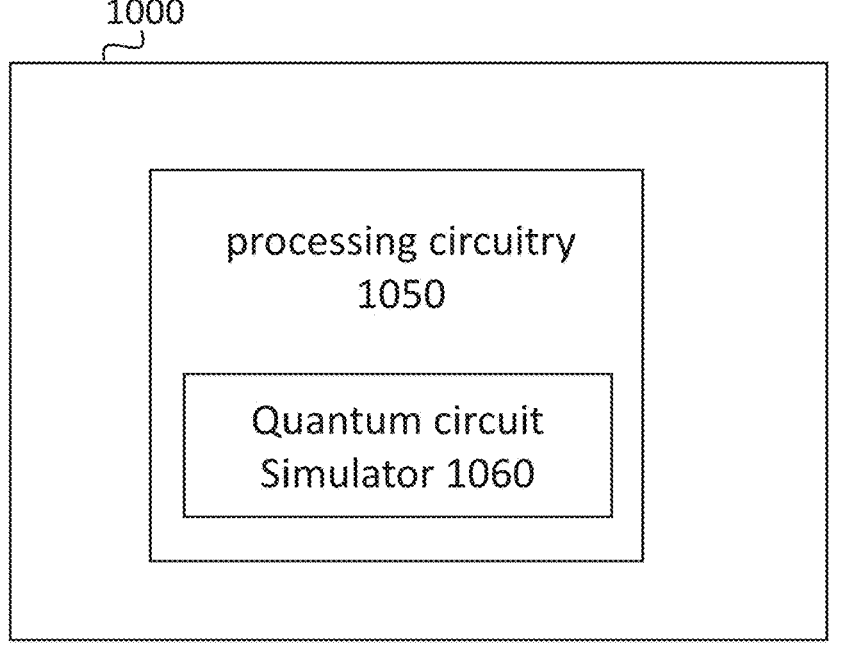
FIG. 10 is a block diagram showing an example of a quantum circuit simulator configured to implement embodiments of the disclosure.

FIG. 10 illustrates an exemplary implementation of such an apparatus 1000, which includes a processing circuitry 1050. The processing circuitry 1050 may include a functional portion 1060 for simulating the quantum circuit.

An apparatus is capable to simulate a subsets of amplitudes of a quantum circuit, e.g., through a partial contraction of a tensor network. Here, simulating may mean computing one or more entries of an amplitude tensor of the quantum circuit, e.g., of the above-mentioned circuit tensor $$C^{i_1,\ldots,i_N}_{j_1,\ldots,j_N}.$$

The amplitude tensor determined in the present implementation may be a subtensor of the circuit tensor $$C^{i_1,\ldots,i_N}_{j_1,\ldots,j_N}$$

of the quantum circuit and may be determined by partially contracting a tensor network of said quantum circuit (in other words, a tensor network representing said quantum circuit).

Such partial contractions appear during circuit simulation if one is interested in determining a plurality of amplitudes of the circuit tensor at once (e.g., jointly).

For instance, assuming a 4-qubit quantum circuit, one may be interested to calculate the probabilities/amplitudes of both the qubit-strings $b_1$=0001 and $b_2$=1001 (differing in the first qubit) in a single pass of the (used) simulator. In other words, one is interested to determine the amplitude that the output qubits are in the states 0, 0, 0, and 1, respectively, as well as to determine the amplitude that the output qubits are in the states 1, 0, 0, and 1, respectively. It is further noted that in the present example the indicated subset consists of a single qubit, the first qubit. The basis vectors corresponding to the two qubit-strings are:

$$e_{0001} = 0\rangle \otimes |0\rangle \otimes |0\rangle \otimes |1\rangle$$

$$e_{1001} = |1\rangle \otimes |0\rangle \otimes |0\rangle \otimes |1\rangle$$

Both of these vectors may then be combined into a single expression, by stacking vectors $e_{0001}$ and $e_{1001}$ into a matrix column-wise:

$$E_\lambda = [e_{1001} \mid e_{0001}] = \begin{vmatrix} 10 \\ 01 \end{vmatrix} \otimes |0\rangle \otimes |0\rangle \otimes |1\rangle.$$

The amplitudes of both $b_1$ and $b_2$ can be calculated similarly to the single amplitude approach:

$$\sigma_\lambda = [\sigma_{1001}\sigma_{0001}] = \langle E_\lambda | C | \psi \rangle.$$

Here the index A denotes which one of the two amplitudes is addressed. The expression above amounts to a partial contraction of a tensor network (all indices are summed except λ). This argument can be followed to include all qubit-strings which differ in 2, 3 or more qubits, up to the number of qubits in the circuit. It is possible to calculate any subset of amplitudes, up to the full state, in a similar way.

In general, one may be interested to determine an amplitude tensor that corresponds to an arbitrary subset (e.g., the indicated subset) of input qubits and/or output qubits (and vice versa). Said amplitude tensor corresponds to the indicated subset as explained below.

Here, it should be noted that, in general, i) the terms "amplitude tensor that corresponds to the indicated subset", "amplitude tensor is of the subset" and "subset tensor" are used interchangeably; ii) qubits in the indicated subset are also referred to as indicated qubits; iii) input qubits and output qubits that are not in the indicated subset are also referred to as complementary qubits; and that iv) the set consisting of the complementary qubits is also referred to as the complementary subset.

In general, the indices of the subset tensor, which assume one of the values 0 and 1, may correspond to the indicated qubits in a one-to-one correspondence.

Furthermore, the subset tensor may correspond to a particular states of the complementary qubits. In general, for each complementary qubit this particular state may be predefined, predetermined, or may be indicated (e.g., together with the indicated subset). For instance, the subset tensor may correspond to an input state in which all input qubits are in the $|0\rangle$ state. The entries of the subset tensor may be (the) amplitudes corresponding to said particular states of the complementary qubits. Moreover, for each combination of index values, the respective entry of the subset tensor may be the amplitude corresponding to i) complementary qubits in the respective particular states, and ii) indicated qubits in the states corresponding to the combination of index values. The subset tensor may be a subtensor of the circuit tensor $$C^{i_1,\ldots,i_N}_{j_1,\ldots,j_N}$$

and/or may be obtained from the circuit tensor by setting, each index (one of the indices $i_1, \ldots, i_N$ and $j_1, \ldots, j_N$) that corresponds to a complementary qubit to 0 or 1 in accordance with the particular state of the respective complementary qubit. For instance, in the above example, when said particular states of all input qubits is the $|0\rangle$ state, we may have $$E_\lambda = C^{\lambda 001}_{0000}.$$

The advantage of using RMCS to determine an elimination order of the intermediate qubits (or a contraction order of the indices of the tensor network) is that any subset of amplitudes starting from a single amplitude up to the full state vector can be evaluated with minimal/minimized possible requirements in terms of memory and/or processor cycles on a single processor. In other words, a quantum circuit simulator according to the preset disclosure facilitates the simulation of multiple amplitudes in a single pass of the (used) algorithm (e.g., jointly). Thus, the novel feature of this simulator is the ability to evaluate any subsets of amplitudes (up to the full state vector) in a single pass. Furthermore, this approach is easy to parallelize [4].

In general, multiple amplitudes can be evaluated by partial contraction of the corresponding tensor networks (not all variables in the expression are summed). However, in contrast with the single amplitude approach, it has not been known how to choose the proper order of summations to achieve minimal/minimized computational cost, and no multiple amplitudes/full state simulators were created.

More specifically, if during the contraction of a tensor network we stop before summing all variables in a sequence, then the result will be a partial contraction of the network. Suppose that in the example above the optimized elimination sequence was found to be $\pi=[\text{ijklmn}]$, which is the elimination sequence illustrated in FIG. 5.

It is noted that the optimized elimination sequence $\pi=[\text{ijklmn}]$, is not an optimal elimination sequence, i.e., has the smallest possible intermediate tensors. For instance, the elimination sequence $\mu=[\text{jiklmn}]$ has no intermediate tensor of rank 3 and thus a lower complexity than the elimination sequence $\pi=[\text{ijklmn}]$, which computes in step 1) the rank-3 tensor $$T^1_{jkl}.$$

If we followed the sequence $\pi=[\text{ijklmn}]$ and contracted all variables in the expression before [mn], then the result is a partial contraction of a tensor network:

$$\Sigma_{ijkl} A_{ij} \cdot B_{jk} \cdot C_{ikl} \cdot D_{km} \cdot E_{ln} \cdot F_{mn} = T^4_{mn}.$$

To perform arbitrary partial contractions, however, we would need to transform elimination sequences without increasing the size of the intermediates. Namely, if a set of variables should be excluded from the summation, we need to find a new elimination sequence such that this set is placed at the end.

In other words, one may be interested only in those amplitudes that correspond to a particular external (input/output), for instance, the k-th qubit being in either state $|0\rangle$ or $|1\rangle$. These external qubits correspond to (e.g., are) the complementary qubits. Then, one may set in the formula $$C^{i_1 \dots, i_N}_{j_1 \dots, j_N} = \sum_{\{b^0_1, \dots, b^{d_0}_1, \dots, b^0_N, \dots, b^{d_N}_N\}} \delta\left(i_1, b^{d_1}_1\right) \dots$$

$$\delta\left(i_N, b^{d_N}_N\right) \psi_1 \dots \psi_\mu \delta\left(j_1, b^0_1,\right) \dots \delta\left(j_N, b^0_N\right)$$

the index $i_k$ or $j_k$ that corresponds to said k-th external qubit to the value, 0 or 1, that corresponds to said state. Since there is a delta function (or, rather Kronecker-delta) for each index of an external qubit, the summation over the corresponding Boolean variable $$b^{d_k}_k$$

or $$b^0_k$$

becomes trivial, as it corresponds to setting said corresponding Boolean variable to 0 or 1 in the tensor network (thereby removing the index as a degree of freedom). Furthermore, the vertex corresponding to such qubit may be removed from the graphical model.

Thus, in general, the indices corresponding to either an input qubit that is not in the indicated subset or an output qubit that is not in the indicated subset may be removed, from the tensor network, by setting the indices to respective predetermined values. Furthermore, the indices corresponding to the intermediate qubits may be removed, from the tensor network, by contraction. Advantageously, before removing the indices corresponding to the intermediate qubits, the indices that correspond to the complementary qubits are removed from the tensor network.

In principle, the indices/vertices of complementary qubits may be removed at any time. However, advantageously, this is done rather sooner than later as it reduces the complexity of further operations. Alternatively, a tensor network and/or graphical model may be constructed after knowing the set of complementary qubits. In this case, indices/vertices corresponding to complementary qubits may not have to be introduced in the first place.

In any case, advantageously, the graph\tensor network based on which the optimized elimination order is determined by means of RMCS has no vertices\indices that correspond to complementary qubits.

Thus, in general, each intermediate qubit may uniquely correspond to a respective index of the tensors. Furthermore, each qubit in the indicated subset may uniquely correspond to a respective (unique) index of the tensors, and each index of the tensors may uniquely correspond to either an input qubit, an output qubit, or an intermediate qubit.

Here, as in the following, "each A uniquely corresponds to a B" means that two different A's do not correspond to the same B. It is further noted that, if the indices of the complementary qubits have not been removed from the tensor network, there may be a one-to one corresponds between qubits of the quantum circuit (internal and external) and unique indices of the tensor network.

If, on the other hand, the indices of the complementary qubits have been removed from the tensor network, there may be a one-to one corresponds between the non-complementary qubits (i.e., either indicated or internal qubits) and unique indices of the tensor network.

Furthermore, in general, there may be a one-to-one correspondence between the vertices of a graph representing a tensor network (of a quantum circuit) and that indices of the tensors that correspond to either an intermediate qubit or a qubit in the indicated subset.

It is noted that this, in particular, may be the case if the vertices corresponding to complementary qubits have been removed from said graph. If, in addition, the indices corresponding to complementary qubits have been removed from the tensor network, there may be a one-to-one correspondence between unique indices and vertices. It is further noted that there may also be a one-to-one correspondence between vertices and indices, if the indices corresponding to complementary qubits have not been removed from said tensor network and the vertices corresponding to said complementary qubits have not been removed from said graph.

It is further noted that, advantageously, the complementary qubits are removed from the graphical model/tensor network before determining the optimized elimination order of the complementary qubits.

Furthermore, in general, if the indices corresponding to complementary qubits have not been removed from a tensor network representing a quantum circuit, there may be a one-to-one correspondence between unique indices of said tensor network and the qubits of said quantum circuit. For instance, there is a one-to-one correspondence between the vertices of the graph of FIG. 9 and the qubits of the quantum circuit shown in FIG. 7. If, on the other hand, the indices corresponding to complementary qubits have been removed from said tensor network (or have not been included in said tensor network in the first place), there may be a one-to-one correspondence between unique indices of said tensor network and that qubits of said quantum circuit that either correspond to indicated qubits or internal qubits.

To summarize the above, as far as the indicated qubits are concerned, one is generally interested in amplitudes for both states, $|0\rangle$ and $|1\rangle$, of the indicated qubits. Thus, indices/vertices of indicated qubits cannot be removed from the tensor network/graphical model (in particular, since, in order to evaluate the corresponding Kronecker-delta, one would have to choose one of the two states of the indicated qubit). Thus, in order to calculate one or more of the amplitudes $$C_{j_1,\ldots,j_N}^{i_1,\ldots,i_N},$$

all internal qubits are contracted, but none of the external qubits is contracted. However, indicated qubits still appear in the tensor network as degrees of freedom and therefore have an impact on the computational complexity.

Thus, when determining an optimized elimination sequence of the internal qubits, which is an elimination sequence that minimizes (in some sense) computational resources and/or memory requirements, the indicated qubits have to be taken into account. This may be done by determining an optimized elimination order of internal and indicated qubits subject to the constraint that the indicated qubits are at the end of said elimination sequence.

According to the present disclosure, an optimal/optimized elimination sequence for an arbitrary subset of amplitudes can be obtained using RMCS. One way to obtain an elimination sequence based on RMCS, are algorithms based on chordal graphs, as further explained below.

In this respect, it should be noted that in general: a chordal graph is a graph in which all cycles of four or more vertices have a chord; a chord is an edge that is not part of the cycle but connects two vertices of the cycle; a cycle is non-empty sequence of mutually different edges which joins a sequence of vertices, wherein, in the sequence of vertices, the only repeated vertices are the first and the last vertex (in other words the first vertex is the last vertex of the sequence are identical, and all other vertices are mutually different and different from the first/last vertex). In other words, a chordal graphs is a graph that does not contain cycles with more than 3 nodes.

The elimination order may be determined iteratively, in reverse order. This may done may selecting from the intermediate qubits, in each step of the iteration, an intermediate qubit that has not been selected in any preceding step of the iteration. The selected intermediate qubit further corresponds, in a chordal graph representing the tensor network, to a vertex neighboring a maximum number of vertices that correspond to either an intermediate qubit that has been selected in any preceding step of the iteration, or a qubit in the indicated subset.

In this way, given (as input) a chordal graph H=(V, Ẽ) and a (indicated) subset of nodes C⊂V, provided there is a clique on C (e.g., the nodes in C form/are a clique), it is possible to build a perfect elimination order π̃, such that S is at the end of f. Here it is noted that a perfect elimination order is, in general, an elimination order in that, for each vertex, the neighbors of said vertex that are higher numbered in said elimination order (e.g., eliminated later than said vertex) form a clique. In general, a graph has a perfect elimination order if and only if it is said graph is chordal.

Furthermore, since the elimination order π̃ is a perfect elimination order of the chordal graph H=(V, Ẽ), if the maximal clique in H=(V, Ẽ) has the size K+1, then the maximal rank of the intermediate tensors appearing in the elimination sequence π̃ will be K. In other words, if the maximal clique in the chordal graph H=(V, Ẽ) has size K, then the order of the maximal virtual tensor in the elimination sequence is also K.

An exemplary implementation of the construction 1070 of the elimination order π̃ using RMCS is now described with reference to the pseudocode shown below:

| Procedure 2 Computing an elimination order with a set of nodes C at the end |
|---|
| Input: H = (V, Ẽ), H is chordal; C ⊂ V; C is clique |
| Output: π̃:V → N, π̃ = {(v_i, i)}_{i=1}^{\|v\|} |
| 1:     function RESTRICTED-MCS(H, C) |
| 2:       for v ∈ V do |
| 3:         cardinality(v) ← 0 |
| 4:       end for |
| 5:       V ← V\C |
| 6:       for i ∈ [\|V\|, \|V\| − 1, ..., 1] do |
| 7:         if C ≠ ∅ then |
| 8:           pick v ∈ C, C ← C\{v} |
| 9:         else |
| 10:           pick v ∈ V with maximum cardinality |
| 11:           V ← V\{v} |
| 12:         end if |
| 13:         π̃ ← π̃ ∪ (v, i) |
| 14:         for w ∈ neighbors(v), w ∉ π̃ do |
| 15:           cardinality(w) ← cardinality(w)+1 |
| 16:         end for |
| 17:       end for |
| 18:     end function |

As can be seen, for each node in the graph H, a counter (in the pseudocode denoted as cardinality (v)) holding the number of already enumerated neighbors of the node is introduced.

First, all of the nodes in C are enumerated in arbitrary order and update counters on all of their neighbors (lines 2 and 3). In other words, lines 2 to 4 of the pseudocode initializes the function cardinality (v): $V \rightarrow \{0, 1, 2, 3, \ldots\}$ by setting, for each node, the value of said function to zero. Furthermore, according to line 5, the indicated subset of nodes C is removed from the set of vertices V.

Then, there is a loop (cycle) with the loop variable i, which executes the code of lines 7 to 16 a total of |V| times (since, according to line 6, i runs from i=|V| to i=1, one time for each vertex of H). During each execution of the said i-loop, one vertex of H is selected/picked (either line 8 or line 10 is executed). Since the selected vertex is also removed from the respective set (lines 8 and 11), no vertex can be selected twice and, thus, each vertex is selected exactly once.

According to lines 7 and 8, the nodes in the subset C are picked first. In other words, before any other node can be picked, the i-loop has to be executed |C| times and each odes in the subset C will be picked exactly once. Since the sequence π is constructed in reverse order, these nodes will be at the end of the sequence πt.

According to lines 9 to 12, a node with maximal number of enumerated neighbors (in other words, a maximal cardinality) is selected and assigned with the next number. In general, ties may be broken arbitrarily. In other words, if two or more vertices have the same cardinality, either of said two or more vertices may be selected.

According to line 13, the node that has been selected in the current execution of the loop (line 8 or 10) is added to the elimination order πt (at the i-th position of π).

According to line 14 to 16, the counters on all neighbor nodes are updated. In other words, the counter/cardinality of neighbors of the selected vertex that have not already been selected (e.g., have not already been added to π) is increased by one.

The elimination order i will be a perfect elimination order of the chordal graph H=(V, Ẽ), with the subset C at the end.

Figure 12:
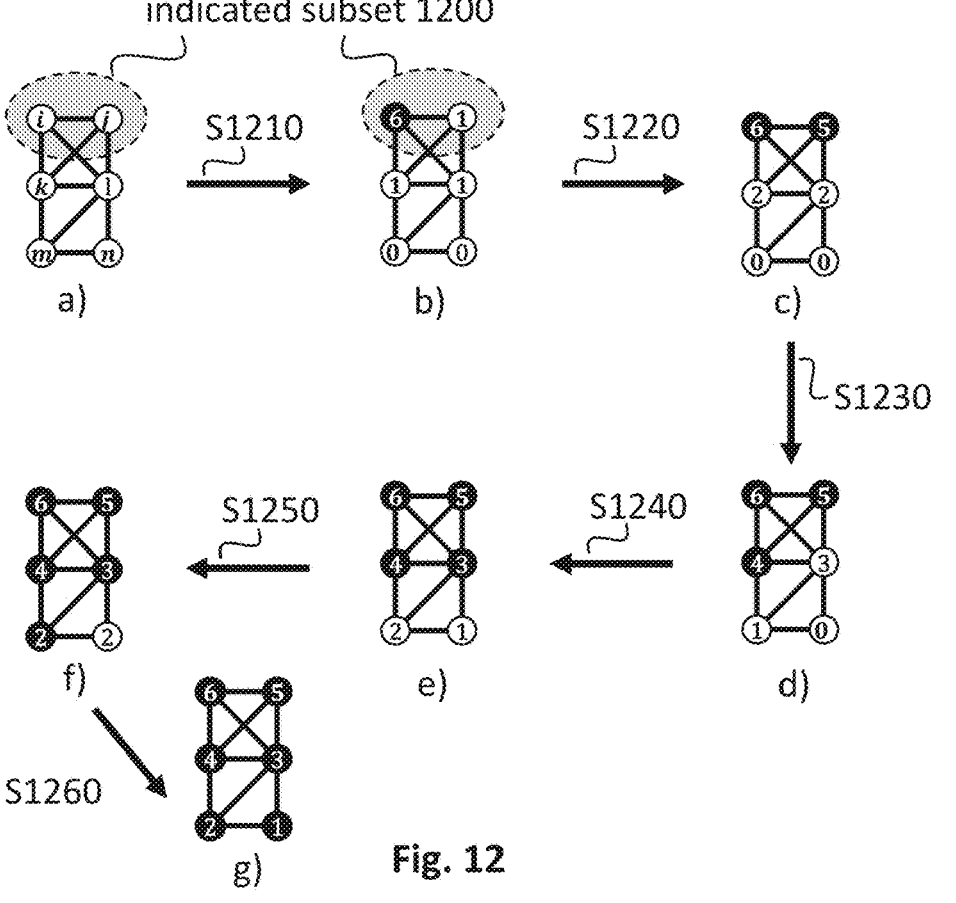
FIG. 12 a)-g) is a graphical representation of constructing, from a chordal graph H=(V, E) and a subset of vertices $C \subset V$, which are clique, a perfect elimination order $\tilde{\pi}$, which has the vertices of C at the end.

Graphically, the described algorithm is illustrated in FIG. 12. As indicated by the shaded ellipse in the first two graphs of FIG. 12, a) and b), in the present example, the subset 1200, consisting of the two upper vertices, is the indicated subset C. All graphs of FIG. 12, a) to g), show the same chordal graph H=(V, Ẽ), which is, as the subset C, an input to the process. The goal is to build an elimination order π of H=(V, Ẽ) such that the nodes in the indicated subset C of vertices is placed at the end.

The letters in the vertices shown in FIG. 12 a) are used in the following description of FIG. 12 to refer to the vertices. It is noted that each of the step S1210, S1220, S1230, S1240, S1250, and S1260 may correspond to one execution of the above-mentioned loop of the pseudo-code. Furthermore, in FIG. 12, white numbers on a black background indicate the assigned position of the respective vertex the elimination sequence, and black numbers on a white background indicate the current value of the cardinality of the respective vertex.

In particular, in step S1210, the vertex i is selected. It is noted that the selection of vertex i at step S1210 is arbitrary. Alternatively, vertex j may be selected instead of vertex i, which yields a perfect elimination sequence with the vertices i and j at the end as well. Vertex i assigned the $6^{th}$ position in the elimination sequence π̃, and the cardinality of its neighbors that have not yet been selected (i.e., vertices jkl) is increased by one.

In step S1220, since vertex j is the only vertex in the vertex in the indicated subset that has not yet been selected, vertex j is selected. Vertex j is assigned the $5^{th}$ position in the elimination sequence π, and the cardinality of its neighbors that have not yet been selected (i.e., vertices kl) is increased by one.

In step S1230, since vertex k has a maximum cardinality of 2 among the vertices that have not yet been selected (i.e., vertices klmn), vertex k is selected. Vertex k is assigned the $4^{th}$ position in the elimination sequence π, and the cardinality of its neighbors that have not yet been selected (i.e., vertices lm) is increased by one. It is noted that at this step vertex l, which has like vertex k has a maximum cardinality of 2, may be selected instead of vertex k, as well. In this case the cardinality of all remaining vertices kmn would increase by one.

In step S1240, since vertex l is the only vertex with a maximum cardinality of 3 among the vertices that have not yet been selected (i.e., vertices lmn), vertex l is selected. Vertex l is assigned the $3^{rd}$ position in the elimination sequence π, and the cardinality of the neighbors of vertex l that have not yet been selected (i.e., vertices mn) is increased by one.

In step S1250, since vertex m is the only vertex with a maximum cardinality of 2 among the vertices that have not yet been selected (i.e., vertices m and n), vertex m is selected, vertex m is assigned the $2^{nd}$ position in the elimination sequence ft, and the cardinality of the neighbors of vertex l that have not yet been selected (i.e., vertices n) is increased by one.

In step S1260, the only remaining vertex, vertex n is selected, and assigned the first position in the elimination sequence π. Thus, in total, the elimination sequence πt= [ijklmn] is obtained.

Another exemplary implementation of the construction 1370 of the elimination order πt using RMCS is now described with reference to FIG. 13.

Figure 13:
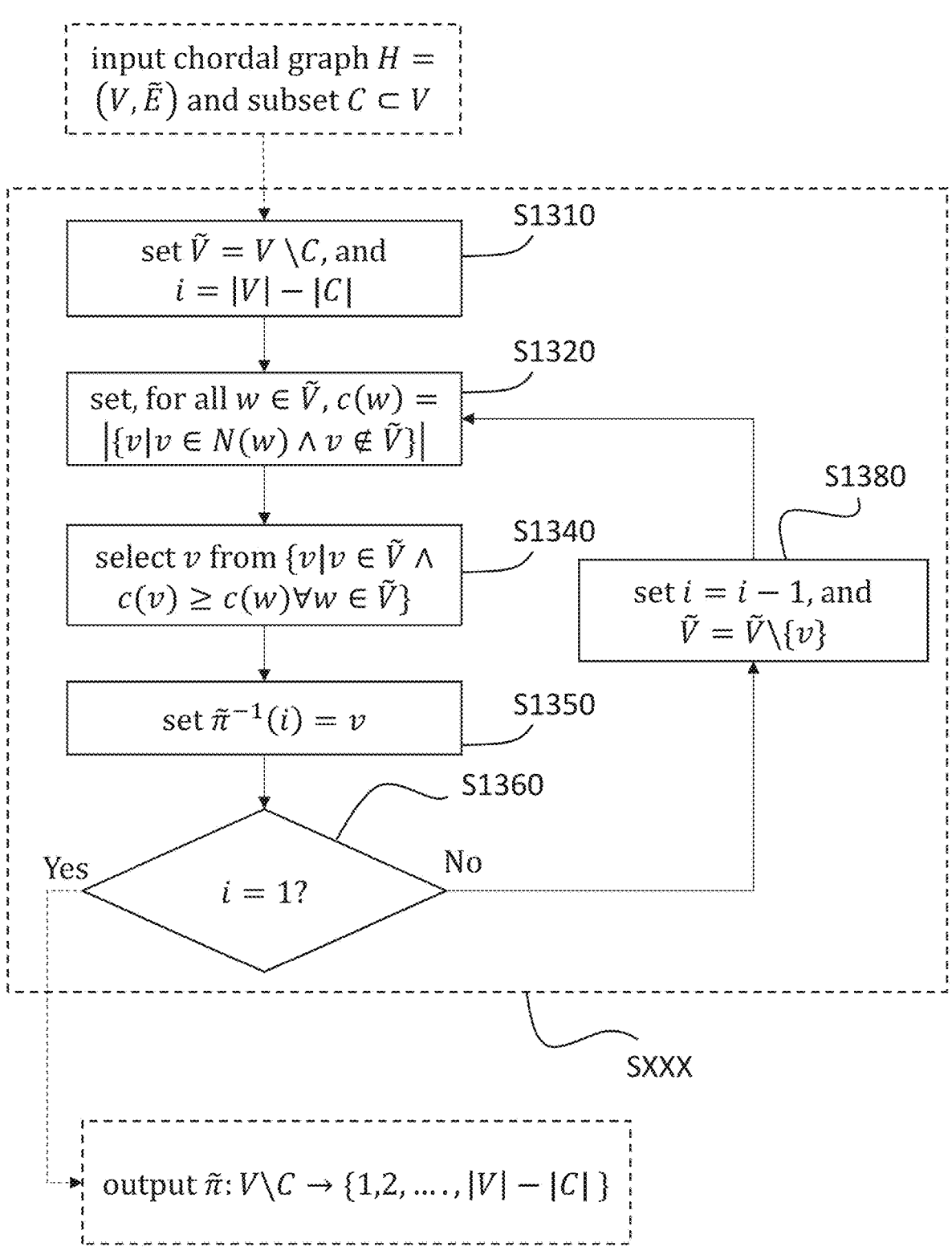
FIG. 13 is a flow diagram illustrating exemplary steps that may be performed to obtain, from a chordal graph $H=(V, \tilde{E})$ and a subset of vertices $C \subset V$, which are clique, a perfect elimination order $\tilde{\pi}$.

As before, input to the process of FIG. 13 is a chordal graph H=(V, Ẽ) and a subset of vertices C ⊂ V. Output of this process is an elimination sequence of the vertices π: $V\backslash C \rightarrow \{1, 2, \ldots, |V|-|C|\}$ and thus may be used to obtain an elimination sequence of the internal qubits of a quantum circuit that is optimized for computing the amplitudes corresponding to the indicated subset C jointly.

First, in step S1310, a loop variable is set to i=|V|-|C|, and a set V̂=V \C, which comprises all vertices still have to be selected, is introduced. It is noted that, in general, i may be replaced by |V̂|, and thus is merely introduced for sake of clarity.

In step S1320, for all vertices that still have to be selected (all w in V̂), the cardinality of said vertex is updated to the $c(w)=|\{v|v \in N(w) \wedge v \notin \hat{V}\}|$, where N(w) is the set of neighbors of w, and A denotes the logical AND. That is to say, the cardinality of a vertex w is set to the number of neighbors of said vertex that do not still have to be selected themselves, which is the number of neighbors that are either in the indicated subset C or have already been selected in a previous execution of the loop. It noted that, if i≠|V|-|C|, the cardinality may updated by incrementing (e.g., increasing by one) for all vertices that still have to be selected and that neighbor the vertex that has most recently been selected. For instance, for all w∈V̂∩N(v), one may set c(w)=c(w)+1.

In step S1340, a vertex v of the vertices that still have to be selected (v E V) with a maximum cardinality among the vertices that still have to be selected is (arbitrarily) selected. The mathematical expression for the set of vertices from which the vertex v may be selected at this step is given as $\{v|v\in\tilde{V}\wedge c(v)\geq c(w)\forall w\in\tilde{V}\}$, where $\forall$ is the mathematical expression for "for all".

It is noted that steps S1320 and S1340 may be combined by directly selecting a vertex v from the set $\{v|v\in\tilde{V}\wedge|\{y|y\in N(v)\wedge y\notin\tilde{V}\}|\geq|\{x|x\in N(w)\wedge x\notin\tilde{V}\}|c(w)\ \forall w\in\tilde{V}\}$ In step S1350, the selected vertex is added to the elimination sequence at the i-th position ($\tilde{\pi}^{-1}(i)=v$).

In step S1360, it is checked whether or not all vertices of H that are not in the indicated subset have be selected (i.e., included in the elimination order). In the present example, this done by checking whether or not i=1. Alternatively, for instance, the condition $|\tilde{V}|=1$ may be checked. If the i=1 ("Yes" in S1360) the process ends with the current elimination sequence $\tilde{\pi}$ as output. It is noted that a perfect elimination order of all vertices of H may be obtained from the elimination sequence $\tilde{\pi}$ by adding the vertices of C in any order at the end of $\pi$. Otherwise ("No" in S1360), after performing step S1380, which decrements the loop variable i (i=i−1), and removes the currently selected vertex from the set of vertices that have to be selected ($\tilde{V}=\tilde{V}\{v\}$), the steps S1320, S1340, S1350, and S1360, are executed again with updated loop variable i and set of vertices $\tilde{V}$.

The above described processes require the input graph $H=(V,\tilde{E})$ is a chordal graph. However, the graphical model, an initial graph $G=(V,E)$ representing the quantum circuit may, a priori, not be chordal. For instance, the graph of the quantum circuit 700 shown in FIG. 9 is not a chordal graph.

In general, any graph can be made chordal by adding edges. In order to obtain a chordal graph $H=(V,\tilde{E})$ from the $G=(V,E)$, edges may have to be added to the graph G, which is also known as a chordal completion of G. Thus, as already indicated, whereas the vertices of a graph G and its chordal completion H my be identical, the vertices of G are in general only a subset of the vertices its chordal completion H, i.e., $E\subseteq\tilde{E}$. In general, the chordal completion of a non-chordal graph is not unique and, in particular, different chordal completions of the same non-chordal graph may have a different treewidth (for instance, there is always the trivial completion by joining each vertex with each other).

Therefore, advantageously, a chordal graph representing a tensor network is a chordal completion of a non-chordal graph representing the tensor network that has a minimal/minimized maximal clique among chordal completions of said non-chordal graph.

In particular, advantageously, a chordal graph representing a tensor network is obtained from a non-chordal graph representing the tensor network using an optimized elimination order of the vertices of the non-chordal graph. In particular, the chordal graph may be obtained by adding edges to said non-chordal graph such that, for each vertex, all neighbors of the vertex that are later in the optimized elimination order than said vertex are a clique.

This chordal graph construction ensures that we don't change the complexity of found perfect elimination order. When a vertex is eliminated from the graph the same edges are added. This procedure doesn't change the treewidth by construction since we introduce edges which will be introduced during elimination anyway.

In general, any elimination order $\pi$ may be used to build, from a given graph G, a chordal graph H, which is also known as the fill-in graph of G with respect to $\pi$. This can be done, e.g., by following said elimination sequence $\pi$, but instead of eliminating nodes and connecting their neighbors into cliques, one simply connects their neighbors which are later in the elimination sequence $\pi$. Note that this operation adds essentially the same edges to the graph as the original node elimination $\pi$, except that the nodes are not removed from the graph. It is noted that by adding only those edges to a graph becomes chordal, and the elimination sequence $\pi$ will be a perfect elimination sequence of the obtained chordal graph. This may be done, for instance, according to the pseudocode shown below:

| Procedure 1 Building chordal graph from the elimination order |
| --- |
| Input: $G = (V, E)$, $\pi : V \rightarrow N$, $\pi = \{(v_i, i)\}_{i=1}^{|V|}$ |
| Output: $H = (V, \tilde{E})$, H is chordal |
| 1:         function BUILD\_CHORDAL\_GRAPH(G, $\pi$) |
| 2:              $\tilde{E} \leftarrow E$ |
| 3:              for $i \in [1, \ldots, |V|]$ do |
| 4:                  $v \leftarrow \pi^{-1}(i)$ |
| 5:                  $U = \emptyset$ |
| 6:                  for w in neighbors(v) do |
| 7:                     if $\pi(w) > i$ then |
| 8:                       $U \leftarrow U \cup w$ |
| 9:                     end if |
| 10:                 end for |
| 11:                 for x, y in pairs(U) do |
| 12:                     $\tilde{E} \leftarrow \tilde{E} \cup (x, y)$ |
| 13:                 end for |
| 14:              end for |
| 15:         end function |

In particular, according to line 2 of the pseudocode, all edges of the input graph are also given to the output graph H.

Between lines 4 to 13 of the pseudocode, there is a loop with a loop variable i, which runs, according to line 3, from i=1 to i=|V|. In other words, the loop is executed once for each vertex in the elimination sequence. The following steps are performed during one execution of said loop. It is noted that, in the last two executions of the i-loop no edge is added to the graph H. In other words, the loop variable i may run only from i=1 to i=|V|-2 without changing the output graph H.

In line 4 of the pseudocode, the next node in the elimination sequence is determined (henceforth denote as the current node). Furthermore, according to line 5, an auxiliary set U is defined, and initialized/reset to being the empty set.

Then, according to lines 6 to 10 of the pseudocode, all neighbors of the current node (line 6) that are later in the elimination sequence than the current node (line 7) are included in the auxiliary set of vertices U (line 8).

Thereafter, according to lines 11 to 13 of the pseudocode, the vertices in U are made to a clique. More specifically, for every pair of (different) vertices (line 11), it is ensured that the set of edges $\tilde{E}$ of H comprises an edge.

The resulting graph $H=(V, \tilde{E})$ (after performing the loop |V| times) is chordal. Furthermore, if the rank of the maximal intermediate tensor is K in the elimination sequence T, then the maximal clique is K+1 in the corresponding chordal graph $H=(V, \tilde{E})$. In other words, if the order of the maximal virtual tensor in the elimination sequence $\pi$ is K, then the maximal clique in the corresponding chordal graph is also K.

It is further noted that, in consequence, the order of the maximal virtual tensor in the elimination sequences n and it is the same, and thus the computational complexity of the elimination sequences $\pi$ and $\tilde{\pi}$ is the same. In other words, since the constructed sequence $\tilde{\pi}$ will have the same complexity as the elimination sequence it used to construct the chordal H, the above-explained construction of it does not increase the computational complexity. The elimination order π may thus be seen as an input (along with the non-chordal graph G) to the construction of the sequence $\tilde{\pi}$, which will be computationally of the same complexity as π and have the specified subset of vertices is placed at the end. This holds independently of the computational complexity of the sequence π, and in particular regardless whether or not the optimized elimination order π was an optimal elimination order. Actually, as already noted above, since finding an optimal elimination order is an NP-Hard problem, in real applications I will frequently be not a truly optimal elimination order, but only some approximation (here also referred to as an optimized elimination order). The constructed sequence $\tilde{\pi}$ will then be optimized/optimal to the same degree as the elimination order π used to obtain the chordal graph H.

Figure 11:
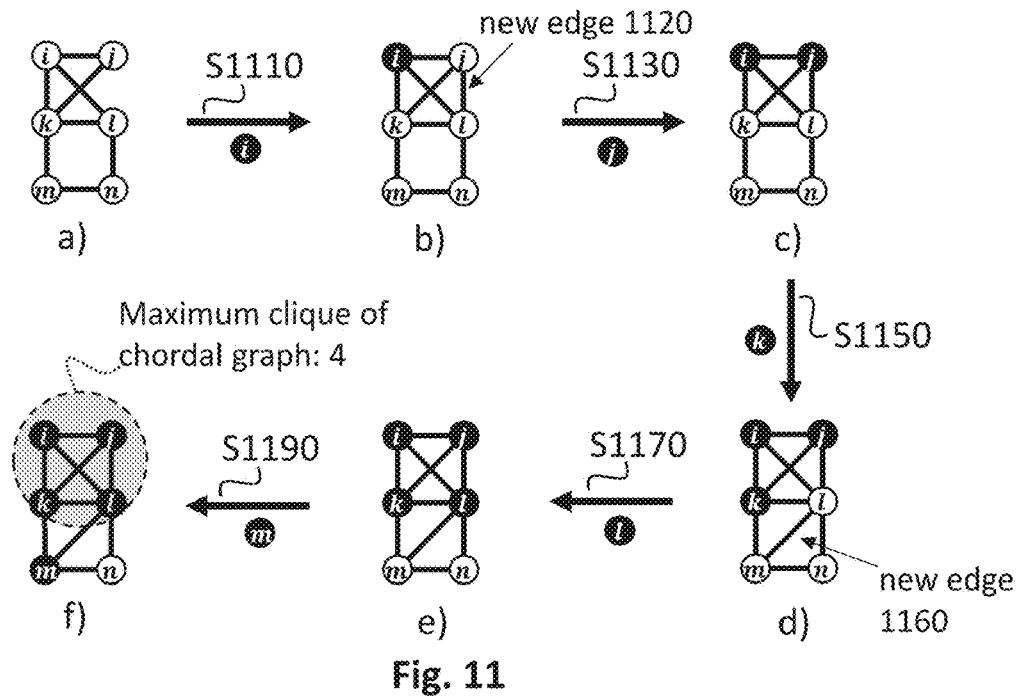
FIG. 11 a)-f) is a graphical representation of producing, from a graph and the elimination order $\pi$=[ijklmn], a chordal graph.

In the following, the above pseudocode is illustrated with reference to FIG. 11 using the elimination sequence π=[ijklmn], which is the elimination sequence known from FIG. 4. More specifically, in FIG. 11 we follow the same sequence as in FIG. 4.

In particular, steps S1110, S1130, S1150, S1170, and S1190 correspond respectively to the first to fifth execution of said lines 4 to 13 of the pseudocode. The last execution of the loop, which may be omitted anyway is not illustrated in FIG. 11. In each of the graphs a) to f), vertices later in the elimination sequence that the current vertex of the last step are indicated by black labels on white background; the other vertices carry white indices on black background.

In step S1110, it is ensured that the neighbors of the current vertex i that are later in the elimination sequence (i.e. vertices jkl) are a clique. Since there is no edge connecting vertex j and l in the graph of FIG. 11. a), the edge 1120 connecting vertex j and vertex l is added to the graph of FIG. 11. a), which yields the graph shown ion FIG. 11. b).

In step S1130, it is ensured that the neighbors of the current vertex j that are later in the elimination sequence (i.e. vertices kl) are a clique. Since there is already an edge connecting these vertices in the graph of FIG. 11. b), no edge has to be added, and thus the graphs shown in FIG. 11. b) and FIG. 11. c) are identical.

In step S1150, it is ensured that the neighbors of the current vertex k that are later in the elimination sequence (i.e. vertices lm) are a clique. Since there is no edge connecting vertex l and m in the graph of FIG. 11. c), the edge 1160 connecting vertex l and vertex m is added to the graph of FIG. 1*c*. a), which yields the graph shown ion FIG. 11. d).

In step S1170, it is ensured that the neighbors of the current vertex l that are later in the elimination sequence (i.e. vertices mn) are a clique. Since there is already an edge connecting these vertices in the graph of FIG. 11. d), no edge has to be added, and thus the graphs shown in FIG. 11. d) and FIG. 11. e) are identical.

In step S1190, it is ensured that the neighbors of the current vertex m that are later in the elimination sequence (i.e. vertices n) are a clique. However, as mentioned above, since there is only one vertex later in the elimination sequence than the vertex m, there is never a vertex to be added in this step. Consequently, the graphs shown in FIG. 11. e) and FIG. 11. f) are identical. As can be seen, the resulting graph in FIG. 11. f) is chordal.

Another exemplary implementation of the construction of a chordal graph H from a graph using an elimination sequence n is now described with reference to FIG. 14.

Steps S1420, S1460, and S1450 essentially implement the frame of an loop with the loop variable i, and in said i-loop step S1440 is executed.

In particular, in step S1420 the loop variable is initialized as i=1, and all edges of the graph G are also given to the graph H ($\tilde{E}$=E).

In step S1460, the exit condition of the i-loop is checked (i=|V|−2?). If i=|V|−2 ("yes" in step 1460), the construction of the chordal graph H is finished. In particular, the current set of edges E are the edges of the chordal graph H=(V, $\tilde{E}$). If i=|V|−2 ("no" in step 1460), the construction of the chordal graph continues with step S1450. Thus, S1440 is executed once for each i∈{1, . . . , |V|−2}.

In step S1450, the loop variable is merely incremented by one (i=i+1). Then, step S1440 is executed (again).

In step S1440, edges are added to the set of edges E, such that, for all vertices x and y that are a) neighbors of the i-th vertex in the elimination sequence ("x, y∈N(($\pi^{-1}$(i)))"),
b) mutually different vertices ("x≠y"), and
c) later than the i-th vertex in the elimination sequence π("π(x)>i∧\π(y)>i", here "∧" is, as in general, the logical AND), there is an edge (x, y) in the (updated) set of edges $\tilde{E}$.

Figure 14:
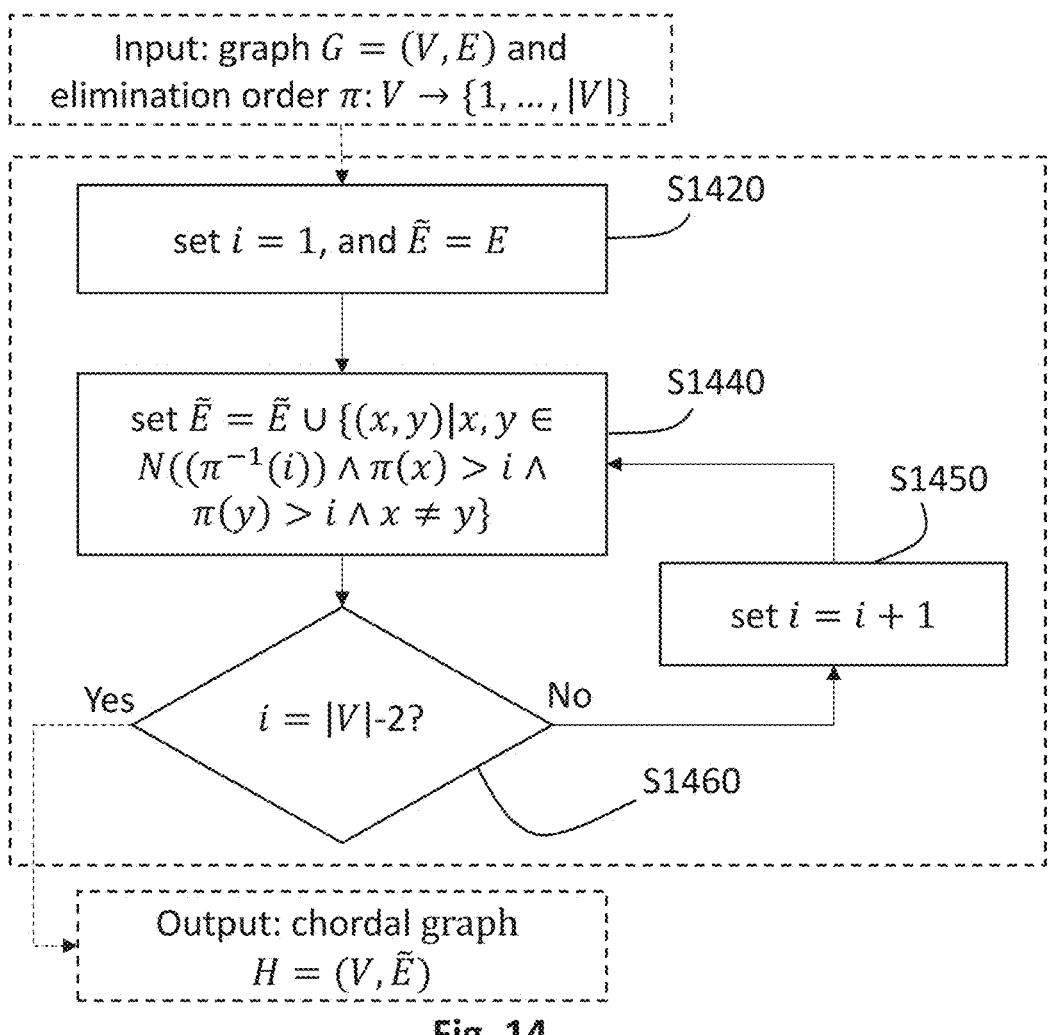
FIG. 14 is a flow diagram illustrating exemplary steps that may be performed to obtain, from a graph $G=(V, E)$, and an elimination order $\pi$: $V = \rightarrow \{1, \ldots, |V|\}$ a chordal graph $H=(V, \tilde{E})$.
Figure 15:
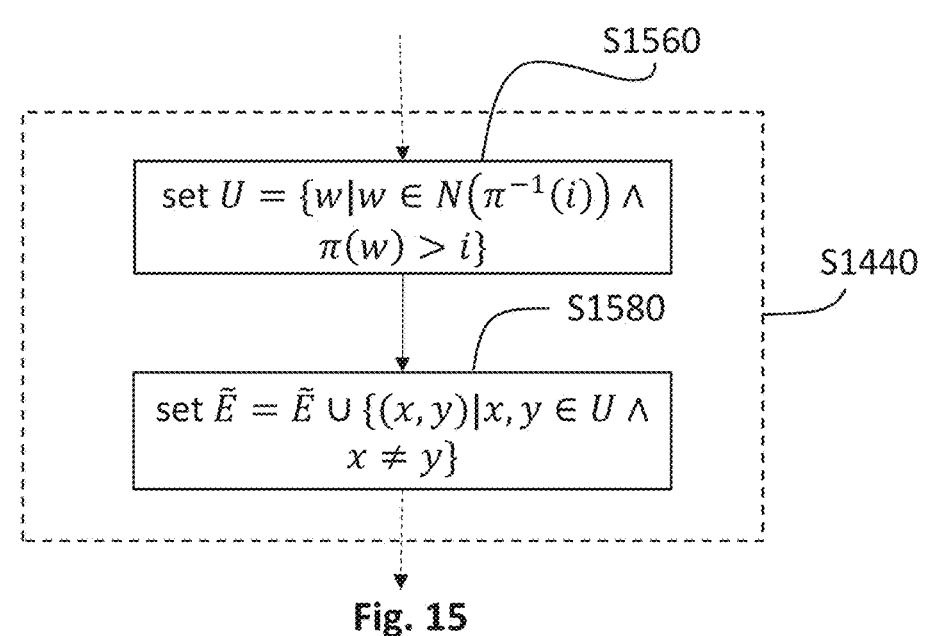
FIG. 15 is a flow diagram illustrating exemplary steps that may be performed by as part of the exemplary steps of FIG. 14.
Figure 16:
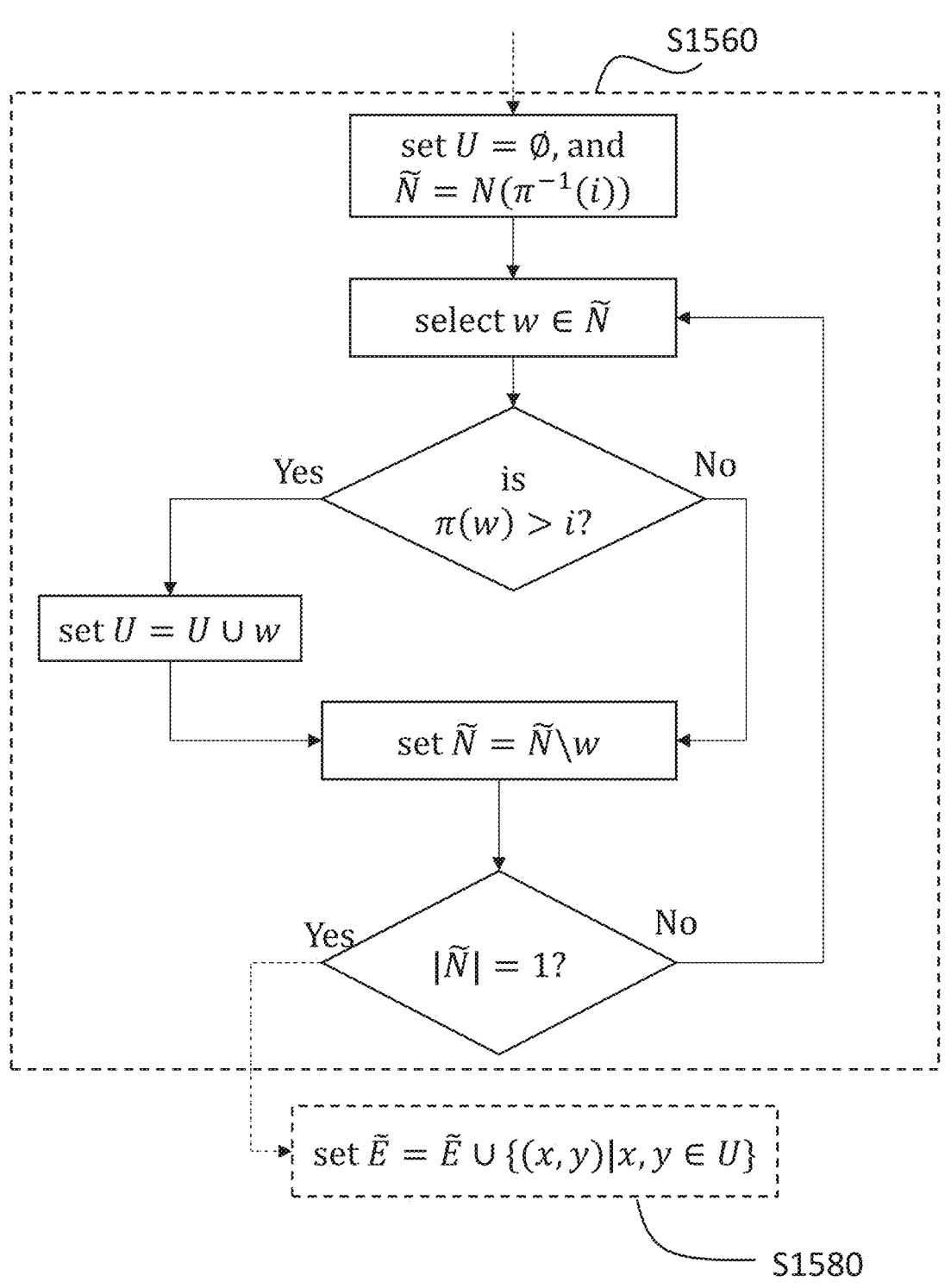
FIG. 16 is a flow diagram illustrating exemplary steps that may be performed by as part of the exemplary steps of FIG. 14 and/or FIG. 15.

FIG. 15 shows a more detailed exemplary implementation of step S1440 of FIG. 14. More specifically, according to FIG. 15, step S1440 may comprise a step S1560 in which an auxiliary subset U consisting of that vertices w that are neighbors of the i-th vertex ("w∈N($\pi^{-1}$(i))") and are later than the i-th vertex in the elimination sequence π("π(w)>i") is determined. This step may, for instance, be implemented as in the lines 5 to 10 of the above pseudocode for "Building chordal graph from the elimination order", which corresponds to the implementation illustrated in FIG. 16.

Step S1440 may further comprise a step S1580, performed after step S1560, in which edges are added to the set of edges E, such that, for all vertices x and y of the auxiliary subset U (x, y∈U) that are mutually different vertices ("x+y") there is an edge (x, y) in the (updated) set of edges $\tilde{E}$.

This step may, for instance, be implemented as in the lines 11 to 13 of the above pseudocode for "Building chordal graph from the elimination order".

Using an optimized elimination order to obtain a chordal graph H representing the quantum circuit from a non-chordal graph G representing the quantum circuit has the advantage that the chordal graph H will have a minimized maximal clique among chordal completions of said non-chordal graph. In other words, the resulting chordal graph H will be a chordal completion of G that has a minimized treewidth among the chordal completions of G.

Figure 17:
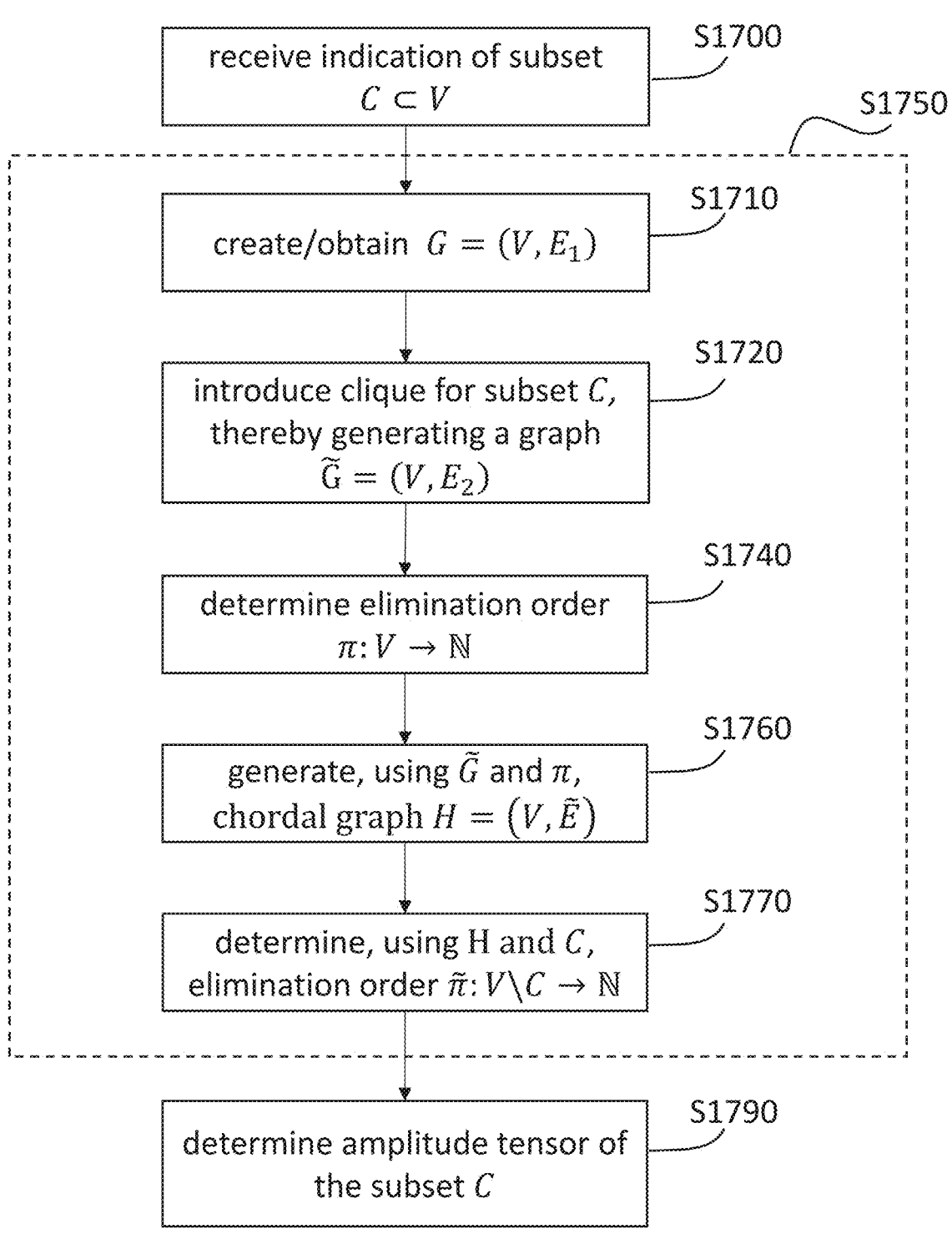
FIG. 17 is a flow diagram illustrating exemplary steps that may be performed by the exemplary quantum circuit simulator shown of FIG. 10.

FIG. 17 illustrates exemplary method steps of a method that may be performed by an apparatus 1000. The procedure outlined below allows an efficient partial tensor network contraction for simulating multiple amplitudes of a quantum circuit in a single pass (jointly).

First, in step S1700, an indication of a subset C⊂V of vertices of the graph G may be obtained. For instance, an indication of the indicated subset of qubits, which is a subset of the external qubits of the quantum circuit, may be obtained. Henceforth, as further explained below, $\tilde{G}$ is assumed to be non-chordal and may be referred to being a non-chordal.

Then, in step S1710, a graph G=(V, $E_1$) that represents the quantum circuit that is to be simulated may be obtained/received. Alternatively, the graph G=(V, $E_1$) may be generated/determined, e.g., from a given/received tensor network expression. Alternatively or addition thereto, a graph G encoding the tensor network representing the quantum circuit may be created/generated first. Then, an amplitude expression (e.g., a tensor network) may be built as explained above. A graph G corresponding to this amplitude expression may then be constructed by the known algorithm from [3], [4]. As an outcome we have a graph G, where nodes represent variables, and cliques represent tensors in the tensor network. In particular, since there are transitive one-to-one correspondences between vertices, indices, and qubits of the quantum circuit, the subset C will be interchangeably referred to as a subset of vertices, indices, and qubits.

In general, the non-chordal graph $\tilde{G}$ representing the tensor network may be determined in accordance with the indicated subset C. In particular, said non-chordal graph $\tilde{G}$ may be determined such that there is a one-to-one correspondence between the vertices of the non-chordal graph $\tilde{G}$ and that indices of the tensors that correspond to either an intermediate qubit or a qubit in the indicated subset.

Furthermore, said non-chordal graph $\tilde{G}$ may be determined such that, for each tensor of the tensor network, the vertices of the non-chordal graph $\tilde{G}$ that correspond to said tensor are a clique. In other words, step S1710 and S1720 may be combined.

For instance, the non-chordal graph $\tilde{G}$ representing the tensor network may be determined, in accordance with the indicated subset C, from a generic non-chordal graph U representing the tensor network. More specifically, for each input or output qubit that is in the indicated subset C (i.e., for each indicated qubit), a single vertex that corresponds to said qubit may be added to the vertices of U. Furthermore, for each indicated qubit, edges may be added such that, for each quantum gate of the quantum circuit, that vertices of the non-chordal graph that correspond to qubits of said quantum gate are a clique. Moreover, there is a one-to-one correspondence between the vertices of the generic non-chordal graph U and the intermediate qubits. For instance, the subgraph of FIG. 9 consisting of the vertices and edges completely within the shaded area is such a generic graph U, and, in order to obtain $\tilde{G}$, the vertices and edges corresponding to indicated qubits are to be added to U.

Alternatively, the non-chordal graph $\tilde{G}$ representing the tensor network may be determined, in accordance with the indicated subset C, from a universal non-chordal graph $\tilde{U}$ representing the tensor network. More specifically, for each input or output qubit that is not in the indicated subset (i.e., for each complementary qubit), all edges connecting a vertex that corresponds to the qubit, and all vertices that correspond to the qubit may be removed from $\tilde{U}$. Moreover, there is a one-to one-correspondence between the vertices of the universal non-chordal graph $\tilde{U}$ and qubits of the quantum circuit, wherein each qubit of the quantum circuit is either an input qubit, an output qubit, or an intermediate qubit. In other words, there is a one-to-one correspondence between vertices of U and the qubits of the quantum circuit, the qubits of the quantum circuit being the indicated, complementary, and intermediate qubits. For instance, the entire graph shown in FIG. 9 is such a universal graph $\tilde{U}$, and, in order to obtain $\tilde{G}$, the vertices and edges corresponding to not-indicated (i.e., complementary) qubits are to be removed from $\tilde{U}$.

For instance, in the above steps S1700 and S1710, the quantum circuit may be read and a set of (external) qubits for which all amplitudes are required may be selected by a user. In other words, a user may select\indicate a subset of nodes C corresponding to indices that are not going to be contracted. It further noted that the order of step S1700 and S1710 may be interchanged, or both steps may be performed simultaneously.

Then a step S1750, in which, using a tensor network of the quantum circuit and RMCS, an elimination order $\tilde{\pi}$: $V\backslash C \rightarrow \{1, 2, \ldots, |V|-|C|\}$ of intermediate qubits within the quantum circuit is determined. Alternatively, an elimination order $\tilde{\pi}: V=\rightarrow\{1, 2, \ldots, |V|\}$, but with the indicated set of nodes C at the end, may be determined. The step S1750 may include the steps S1720, S1740, S1760, and S1770. Furthermore, if the graph $G=(V, E_1)$ and/or the tensor network representing the quantum circuit are determined (or modified) in step S1710, step S1710 may also be considered part of step S1750.

Then, in step S1720, edges may be added to the graph G, such that the vertices corresponding to the indicated qubits are a clique. In other words, if there is no clique on the set C, then edges are added to form it. We get a graph $\tilde{G}=(V, E_2)$ where there is a clique on the nodes in C. In other words, a clique (if a clique did not already exist) is introduced on those nodes denoting/corresponding to variables that will not be eliminated. In other words, advantageously, before determining an optimized elimination order I, the non-chordal graph $\tilde{G}$ s modified by adding, to the non-chordal graph $\tilde{G}$, edges such that the vertices corresponding to the qubits of the indicated subset are a clique. In the original graph G, a clique connecting the vertices corresponding to the target subset C of qubits is introduced. This results in a graph $\tilde{G}$, which may have a treewidth that is larger than the treewidth of G. It is noted that step S1720 may, advantageously, be omitted if the vertices corresponding to the subset C already are clique of G. In this case the following steps may be performed using $\tilde{G}=G$.

Then, in step S1740, an optimized elimination n of the graph $\tilde{G}$ may be determined. It is noted that, advantageously, if the graph $\tilde{G}$ is already a chordal graph, this step as well as the following step, (i.e., steps S1740 and S1760) are not performed. In this case, steps S1740 and S1760 may be omitted, and, after step S1720, step S1770 may be performed using $H=\tilde{G}$. However, in the following, it is assumed that $\tilde{G}$ is a non-chordal graph.

In general, the optimized elimination order n of the vertices of the non-chordal graph representing the tensor network may be determined using an optimization procedure. In general, the optimization procedure may minimize a maximal clique of the corresponding fill-in graph. The corresponding fill-in graph is the fill-in graph of the non-chordal graph $\tilde{G}$ with respect to the optimized elimination order T. Said fill-in graph may be obtained from the non-chordal graph $\tilde{G}$ by adding edges to the non-chordal graph $\tilde{G}$ such that, for each vertex of the fill-in graph, all neighbors (in the fill-in graph) of said vertex that are later in the optimized elimination order than said vertex are a clique in the fill-in graph. In general, a fill-in graph is a chordal graph. Thus, in other words, the optimization procedure may minimize the maximal clique/treewidth of the resulting chordal/fill-in graph.

For instance, in step S1740, an elimination order n may be determined by computing a tree decomposition with minimized treewidth (most computationally intensive part, NP-hard problem). The tree decomposition of the graph $\tilde{G}$ may be found using any of the many available algorithms and methods. As a result we obtain an optimized elimination order $\pi$ of the vertices of $\tilde{G}$. In other words, in general, the determining of the (optimized) elimination order of the intermediate qubits may include determining an optimized (e.g., optimized with respect to the edges of $\tilde{G}$) elimination order $\pi$ of (all) the vertices V. It is noted that this optimized elimination order n corresponds to an elimination order of indicated and intermediate qubits.

In general, the optimized elimination order n of the vertices of the non-chordal graph $\tilde{G}$ representing the tensor network may be determined such that it minimizes a maximal intermediate treewidth (e.g., $\max_{tw}(\pi) \leq \max_{tw}(\lambda)$, for all $\lambda$ that are an elimination order of $\tilde{G}$). Here the maximal intermediate treewidth $\max_{tw}(\lambda)$ of an elimination order $\lambda$ is the maximal treewidth among treewidths of intermediate graphs that correspond to said elimination order $\lambda$. In other words, all intermediate graphs corresponding obtained from $\tilde{G}$ and said elimination order $\lambda$ have a treewidth equal to or smaller than $\max_{tw}(\lambda)$ ($\max_{tw}(\lambda)$ being an integer) and at least one of said intermediate graphs has a treewidth of $\max_{tw}(\lambda)$. In particular, each of the intermediate graphs corresponding to an elimination order A may be obtained from the non-chordal graph $\tilde{G}$ by eliminating, successively in accordance with said elimination order $\lambda$, the vertices corresponding to respective first n qubits in the elimination order A. In other words, all vertices $v_i = \lambda^{-1}$ (i), with i≤n are removed from $\tilde{G}$ in the order $v_1, v_2, \ldots, v_n$. In general, n may be an integer larger than zero and smaller than the number |V| of the vertices of the non-chordal graph $\tilde{G}$. Furthermore, each vertex $v_i$ may be eliminated by removing, from said non-chordal graph $\tilde{G}$, all edges with an endpoint corresponding to the vertex $v_i$, removing, from said non-chordal graph $\tilde{G}$, the vertex $v_i$, and adding, to said non-chordal graph $\tilde{G}$, edges such that all neighbors of the vertex $v_i$ are connected.

The nodes from the set C, however, may not be at the end of $\pi$. However, as already explained above, a chordal graph H=(V, $\tilde{E}$), obtained from $\tilde{G}$ using $\pi$, may be used as an intermediate to transform the elimination order $\pi$ to have a specific set of nodes at the end. Any (elimination) ordering of nodes of a chordal graph that does not (when removing successively vertices and connecting the neighbors of the respective vertex) introduce new edges, and hence does not increase the size of the maximal clique, are computationally equivalent. Thus, the evaluation of tensor network contraction according to the orders $\pi$ and $\tilde{\pi}$ will be computationally equivalent. In other words, two perfect elimination orders of a graph are computationally equivalent. In this way, according to the present disclosure, a chordal graphs may be used to build, using RMCS, an equivalent elimination ordering for partial tensor network contraction. In other words, the order $\pi$ can be transformed into $\tilde{\pi}$ by the use of RMCS, such that the set of nodes C is at the end of $\tilde{\pi}$. This new ordering ft is also perfect since any zero fill-in elimination ordering of a chordal graph has the same complexity. With chordal graphs it is possible to move a target subset C of vertices to the end of an elimination order with polynomial complexity. The procedure according to the present disclosure extends the usual MCS algorithm, as e.g., described in [5], facilitating placing a specified set of nodes C to the end of the sequence $\pi$.

Accordingly, in step S1760, using the graph $\tilde{G}$ and $\pi$, a chordal graph H=(V, $\tilde{E}$), may be constructed/generated.

Then, in step S1770, using H and C, a perfect elimination order $\tilde{\pi}$: V\C$\rightarrow$\{1, 2, ..., |V|−|C|\} of that vertices of H that correspond to intermediate qubits may be determined. This a new elimination orderit may be determined by the RMCS algorithm. This elimination order $\tilde{\pi}$ may correspond, with respect to the indicated (external) qubits, to an optimized partial contraction order of the indices a tensor network representing the quantum circuit in terms of computational cost and/or memory. It is further noted that the subset C may be appended/added in any order to the elimination order $\tilde{\pi}$: V\C=$\rightarrow$\{1, 2, ..., |V|−|C|\} and the resulting elimination order will be a perfect elimination order V$\rightarrow$\{1, 2, ..., |V|\} of H, and, in this sense, the elimination order $\tilde{\pi}$ is referred to as being perfect.

Then, in step S1790, an amplitude tensor of/corresponding to the subset C may be determined. For instance, the tensor network may be (partially) contracted according to the order $\pi$ (for example, with a bucket elimination algorithm). The contraction is terminated when all variables not in the set C are eliminated from the tensor network. The contraction is terminated when all variables not in the set C are eliminated.

Embodiments, e.g. the apparatus 1000 for simulating a quantum circuit, and functions described herein, e.g. with reference to the apparatus 1000, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

The present disclosure provides embodiments for simulating a quantum circuit. In particular, an indication of a subset of input and output qubits of the quantum circuit is received. The indicated subset corresponds to an amplitude tensor of the quantum circuit that is to be determined, wherein the amplitude tensor comprises amplitudes for different combinations of states of the qubits of the indicated subset. Using a tensor network of the quantum circuit and Restricted Maximum Cardinality Search (RMCS), an elimination order of intermediate qubits within the quantum circuit is determined. The amplitude tensor is determined by removing, successively in accordance with the elimination order, that indices of the tensors of the tensor network that correspond to the intermediate qubits from the tensor network.

The invention claimed is:

1. An apparatus for simulating a quantum circuit for at least one of verification and validation of a quantum processor, the apparatus including a processing circuitry configured to:

receive an indication of a subset of input and output qubits of the quantum circuit, the indicated subset corresponding to an amplitude tensor of the quantum circuit that is to be determined, the amplitude tensor comprising amplitudes for different combinations of states of qubits of the indicated subset;

determine, using a tensor network of the quantum circuit and Maximum Cardinality Search (MCS), an elimination order of intermediate qubits within the quantum circuit, wherein the qubits of the indicated subset are placed at an end of an elimination sequence of the elimination order; and determine the amplitude tensor by removing, successively in accordance with the elimination order, indices of tensors of the tensor network that correspond to the intermediate qubits from the tensor network;

wherein qubits, unique indices among the indices of tensors, and vertices are in a one-to-one-to-one correspondence.

2. The apparatus according to claim 1, wherein the elimination order is determined iteratively, in a reverse order, by selecting from the intermediate qubits, in each process of the iteration, an intermediate qubit that has not been selected in any preceding process of the iteration, and corresponds to, in a chordal graph representing the tensor network, a vertex neighboring a maximum number of vertices that correspond to either the following (a) or (b):

(a) an intermediate qubit that has been selected in any preceding process of the iteration, or (b) a qubit in the indicated subset.

3. The apparatus according to claim 2, wherein each intermediate qubit uniquely corresponds to a respective index of the tensors, each qubit in the indicated subset uniquely corresponds to a respective index of the tensors, and each index of the tensors uniquely corresponds to either an input qubit, an output qubit, or an intermediate qubit; and/or a one-to-one correspondence exists between the vertices of the chordal graph and indices that correspond to either an intermediate qubit or a qubit in the indicated subset.

4. The apparatus according to claim 2, wherein the chordal graph representing the tensor network is a chordal completion of a non-chordal graph representing the tensor network that has a minimized maximal clique among chordal completions of the non-chordal graph.

5. The apparatus according to claim 4, wherein the chordal graph is obtained from the non-chordal graph representing the tensor network using an optimized elimination order of the vertices of the non-chordal graph, wherein the chordal graph is obtained by adding edges to the non-chordal graph such that, for each vertex, all neighbors of the vertex that are later in the optimized elimination order than the vertex are a clique in the chordal graph.

6. The apparatus according to claim 5, wherein for each quantum gate of the quantum circuit, there is a tensor of the tensor network that has, for each qubit of the quantum gate that is either an intermediate qubit or in the indicated subset, one index that corresponds to the qubit;

for each quantum gate of the quantum circuit, that vertices of the non-chordal graph that correspond to the qubits of the quantum gate are a clique.

7. The apparatus according to claim 6, wherein the determining of the elimination order of the intermediate qubits includes: determining the optimized elimination order.

8. The apparatus according to claim 7, wherein the optimized elimination order of the vertices of the non-chordal graph representing the tensor network is determined using an optimization procedure, wherein the optimization procedure minimizes a maximal clique of a graph that is obtained by adding edges to the non-chordal graph such that, for each vertex of the graph, all neighbors of the vertex that are later in the optimized elimination order than the vertex are a clique in the graph.

9. The apparatus according to claim 7, wherein before determining of the optimized elimination order, the non-chordal graph is modified by adding, to the non-chordal graph, edges such that the vertices corresponding to the qubits of the indicated subset are a clique.

10. The apparatus according to claim 1, wherein the processing circuitry is configured to:

determine, in accordance with the indicated subset, a non-chordal graph representing the tensor network such that both of the following situations (i) and (ii) exist:

(i) a one-to-one correspondence exists between the vertices of the non-chordal graph and indices of the tensors that correspond to either an intermediate qubit or a qubit in the indicated subset; and (ii) for each tensor of the tensor network, the vertices of the non-chordal graph that correspond to the tensor are a clique.

11. The apparatus according to claim 1, wherein the processing circuitry is configured to:

determine, in accordance with the indicated subset, a non-chordal graph representing the tensor network from a generic non-chordal graph representing the tensor network by adding the following (a) and (b):

(a) for each input or output qubit that is in the indicated subset, a single vertex that corresponds to said qubit, and (b) edges, such that, for each quantum gate of the quantum circuit, vertices of the non-chordal graph that correspond to the qubits of the quantum gate are a clique, wherein there is a one-to-one correspondence between the vertices of the generic non-chordal graph and the intermediate qubits.

12. The apparatus according to claim 1 wherein the processing circuitry is configured to:

determine, in accordance with the indicated subset, a non-chordal graph representing the tensor network from a universal non-chordal graph representing the tensor network by removing, for each input or output qubit that is not in the indicated subset, both of the following (a) and (b):

(a) all edges connecting a vertex that corresponds to the qubit, and (b) all vertices that correspond to the qubit;

wherein there is a one-to-one correspondence between the vertices of the universal non-chordal graph and qubits of the quantum circuit, wherein each qubit of the quantum circuit is either an input qubit, an output qubit, or an intermediate qubit.

13. The apparatus according to claim 1, wherein the processing circuitry is configured to:

remove, before removing the indices corresponding to the intermediate qubits, indices from the tensors of the tensor network that correspond to either an input qubit that is not in the indicated subset, or an output qubit that is not in the indicated subset.

14. The apparatus according to claim 1, wherein the indices corresponding to either an input qubit that is not in the indicated subset or an output qubit that is not in the indicated subset are removed from the tensor network by setting the indices to respective predetermined values; and/or the indices corresponding to the intermediate qubits are removed from the tensor network by contraction.

15. A method for simulating a quantum circuit for at least one of verification and validation of a quantum processor, applied to a processing circuitry of an apparatus, the method comprising:

receiving an indication of a subset of input and output qubits of the quantum circuit, the indicated subset corresponding to an amplitude tensor of the quantum circuit that is to be determined, the amplitude tensor comprising amplitudes for different combinations of states of qubits of the indicated subset;

determining, using a tensor network of the quantum circuit and Maximum Cardinality Search (MCS), an elimination order of intermediate qubits within the quantum circuit, wherein the qubits of the indicated subset are placed at an end of an elimination sequence of the elimination order; and determining the amplitude tensor by removing, successively in accordance with the elimination order, indices of the tensors of the tensor network that correspond to the intermediate qubits from the tensor network, wherein qubits, unique indices among the indices of tensors, and vertices are in a one-to-one-to-one correspondence.

16. The method according to claim 15, wherein the elimination order is determined iteratively, in a reverse order, by selecting from the intermediate qubits, in each process of the iteration, an intermediate qubit that has not been selected in any preceding process of the iteration, and corresponds to, in a chordal graph representing the tensor network, a vertex neighboring a maximum number of vertices that correspond to either the following (a) or (b):

(a) an intermediate qubit that has been selected in any preceding process of the iteration, or (b) a qubit in the indicated subset.

17. The method according to claim 16, wherein each intermediate qubit uniquely corresponds to a respective index of the tensors, each qubit in the indicated subset uniquely corresponds to a respective index of the tensors, and each index of the tensors uniquely corresponds to either an input qubit, an output qubit, or an intermediate qubit; and/or a one-to-one correspondence exists between the vertices of the chordal graph and indices that correspond to either an intermediate qubit or a qubit in the indicated subset.

18. A non-transitory computer-readable medium, comprising processor-executable instructions which, when executed by a processing circuitry of an apparatus, cause the apparatus to implement a method for simulating a quantum circuit for at least one of verification and validation of a quantum processor, the method comprising:

receiving an indication of a subset of input and output qubits of the quantum circuit, the indicated subset corresponding to an amplitude tensor of the quantum circuit that is to be determined, the amplitude tensor comprising amplitudes for different combinations of states of qubits of the indicated subset;

determining, using a tensor network of the quantum circuit and Maximum Cardinality Search (MCS), an elimination order of intermediate qubits within the quantum circuit, wherein the qubits of the indicated subset are placed at an end of an elimination sequence of the elimination order; and determining the amplitude tensor by removing, successively in accordance with the elimination order, indices of the tensors of the tensor network that correspond to the intermediate qubits from the tensor network, wherein qubits, unique indices among the indices of tensors, and vertices are in a one-to-one-to-one correspondence.

19. The non-transitory computer-readable medium according to claim 18, wherein the elimination order is determined iteratively, in a reverse order, by selecting from the intermediate qubits, in each process of the iteration, an intermediate qubit that has not been selected in any preceding process of the iteration, and corresponds to, in a chordal graph representing the tensor network, a vertex neighboring a maximum number of vertices that correspond to either the following (a) or (b):

(a) an intermediate qubit that has been selected in any preceding process of the iteration, or (b) a qubit in the indicated subset.

20. The non-transitory computer-readable medium according to claim 19, wherein each intermediate qubit uniquely corresponds to a respective index of the tensors, each qubit in the indicated subset uniquely corresponds to a respective index of the tensors, and each index of the tensors uniquely corresponds to either an input qubit, an output qubit, or an intermediate qubit; and/or a one-to-one correspondence exists between the vertices of the chordal graph and indices that correspond to either an intermediate qubit or a qubit in the indicated subset.

* * * * *